US012157332B2

(12) United States Patent
Goodfellow et al.

(10) Patent No.: US 12,157,332 B2
(45) Date of Patent: Dec. 3, 2024

(54) RODS FOR USE WITH HANGING FILE HOLDERS

(71) Applicant: TOPS Products LLC, Naperville, IL (US)

(72) Inventors: Andrew Goodfellow, Phoenix, AZ (US); David Gruza, Phoenix, AZ (US); Christopher Holman, Mesa, AZ (US); Candie Harris, Brookville, NY (US); Braden Jones, Phoenix, AZ (US)

(73) Assignee: TOPS Products LLC, Chicago, IL (US)

( * ) Notice: Subject to any disclaimer, the term of this patent is extended or adjusted under 35 U.S.C. 154(b) by 0 days.

(21) Appl. No.: 18/545,637

(22) Filed: Dec. 19, 2023

(65) Prior Publication Data

US 2024/0190163 A1 Jun. 13, 2024

Related U.S. Application Data

(63) Continuation of application No. 17/714,706, filed on Apr. 6, 2022, now Pat. No. 11,845,297, which is a (Continued)

(51) Int. Cl.
*B42F 15/00* (2006.01)
*A47B 63/00* (2006.01)

(52) U.S. Cl.
CPC .......... *B42F 15/0064* (2013.01); *A47B 63/00* (2013.01); *B42F 15/0035* (2013.01)

(58) Field of Classification Search
CPC ... A47B 63/00; B42F 15/0035; B42F 15/0064
(Continued)

(56) References Cited

U.S. PATENT DOCUMENTS

| | | | | |
|---|---|---|---|---|
| 546,647 | A | 9/1895 | Barnes | |
| 1,268,143 | A * | 6/1918 | Palmgren | A47B 53/00 211/162 |

(Continued)

FOREIGN PATENT DOCUMENTS

| | | | |
|---|---|---|---|
| EP | 1535752 | A2 | 6/2005 |
| EP | 1607236 | A1 | 12/2005 |

(Continued)

OTHER PUBLICATIONS

European Search Report for European Patent Application No. 08166326.2 issued on Mar. 6, 2009.

(Continued)

*Primary Examiner* — Joshua E Rodden
(74) *Attorney, Agent, or Firm* — Hanley, Flight & Zimmerman, LLC

(57) ABSTRACT

Rods for use in a filing system are disclosed. An example file folder rod includes a first end, a second end and an elongated body extending between the first end and the second end, the elongated body having a longitudinal axis. The example rod also includes a hook coupled to the first end of the rod. The example hook includes a longitudinal portion extending along the longitudinal axis, an elongated hook portion coupled to an end of the longitudinal portion with the elongated hook portion extending from the longitudinal portion a first distance, and a first extension extending from the longitudinal portion with the first extension extending from the longitudinal portion a second distance, the second distance less than the first distance.

18 Claims, 15 Drawing Sheets

Related U.S. Application Data continuation of application No. 17/156,111, filed on Jan. 22, 2021, now Pat. No. 11,318,776, which is a continuation of application No. 16/785,178, filed on Feb. 7, 2020, now Pat. No. 10,933,682, which is a continuation of application No. 15/800,487, filed on Nov. 1, 2017, now Pat. No. 10,737,527, which is a continuation of application No. 15/407,688, filed on Jan. 17, 2017, now Pat. No. 9,809,048, which is a continuation of application No. 11/877,045, filed on Oct. 23, 2007, now Pat. No. 9,573,408.

(58) Field of Classification Search
USPC ....... 211/45, 46, 85.3, 100, 105, 105.1, 123, 211/124, 126.13, 182, 183, 191, 204, 206; 248/304, 322, 340; 229/67.2; D19/90; 493/476; 312/183, 184; 281/43
See application file for complete search history.

(56) References Cited

U.S. PATENT DOCUMENTS 1,348,546 A 8/1920 Cutler
1,524,348 A 1/1925 Field
1,867,158 A 7/1932 Kline
1,867,159 A 7/1932 Kline
1,953,552 A 4/1934 Dequeker
2,257,052 A 9/1941 Hanna
2,325,317 A 7/1943 Hanns
2,519,996 A 8/1950 Blake
2,524,743 A * 10/1950 Wright ...................... B60R 7/10 224/927
2,605,769 A 8/1952 Lampel
2,608,420 A 8/1952 Eck
2,626,610 A 1/1953 McTavish
2,631,589 A 3/1953 Zalkind
2,656,233 A 10/1953 Bollmann
2,707,610 A 5/1955 Fillion
2,765,793 A 10/1956 Becker
2,874,699 A 2/1959 Dunleavy
2,910,985 A 11/1959 Epstein
2,983,232 A * 5/1961 Henrikson ................ F16B 7/22 403/201
3,244,179 A 4/1966 Porteous
3,255,758 A * 6/1966 Gauche ............... B42F 15/0035 229/67.2
3,288,144 A 11/1966 Hyams
3,410,512 A 11/1968 Del Vecchio
3,424,418 A 1/1969 Freedman
3,501,019 A 3/1970 Armstrong
3,524,688 A 8/1970 Dean
3,572,867 A 3/1971 Cooper
3,664,051 A 5/1972 Benichou
3,667,854 A 6/1972 Jonas
3,684,340 A 8/1972 Kirkorian
3,779,393 A 12/1973 Grundell
3,790,242 A 2/1974 Sullivan
3,801,175 A 4/1974 Giulie
3,850,488 A 11/1974 Elias
3,863,828 A 2/1975 King
3,863,998 A 2/1975 Grundell
3,865,445 A * 2/1975 Dean .................. B42F 15/0047 229/67.2
3,885,726 A 5/1975 Fridlund
3,957,321 A * 5/1976 Rose .................. B42F 15/0064 229/67.2
3,999,630 A 12/1976 McPhee
4,031,646 A 6/1977 De Nouel
4,053,057 A 10/1977 Snowden
4,056,296 A 11/1977 Hedstrom
4,103,606 A 8/1978 Gitcho
4,105,268 A 8/1978 Elias
4,114,963 A 9/1978 Menahem
4,181,381 A 1/1980 St Amand
4,209,925 A 7/1980 Brugmann
4,218,838 A 8/1980 Zippel
4,236,770 A 12/1980 Moore
4,256,425 A * 3/1981 Burgess ................. B61D 45/00 410/150
4,285,555 A * 8/1981 Hedstrom ........... B42F 15/0064 312/190
4,395,058 A 7/1983 Terrell
4,420,086 A * 12/1983 Bardes ................ B42F 15/0035 229/67.2
4,445,799 A * 5/1984 Wright ................ B42F 15/0064 281/43
4,488,651 A 12/1984 Bishop
4,489,836 A 12/1984 Terrell
4,527,694 A 7/1985 Bolt
4,530,176 A 7/1985 Rejwan
D285,217 S 8/1986 Smernoff
4,652,165 A 3/1987 Bertesi
4,666,047 A 5/1987 Fletcher
4,703,982 A 11/1987 Roeck
4,842,435 A 6/1989 Thomas
4,870,767 A 10/1989 Davies
4,893,745 A 1/1990 Weber
4,950,096 A * 8/1990 Gilder ................. B42F 15/0064 402/7
4,988,006 A 1/1991 Lundin
5,042,769 A 8/1991 Smed
5,048,697 A 9/1991 Payne
5,052,646 A 10/1991 Hawes, Jr.
5,066,045 A 11/1991 Hawes, Jr.
D322,284 S 12/1991 Whaley et al.
5,082,125 A 1/1992 Ninni
5,082,404 A * 1/1992 Stewart ..................... B60P 7/10 410/127
5,104,269 A 4/1992 Hardison
5,154,527 A 10/1992 Blessing
5,163,768 A 11/1992 Salisbury
5,197,762 A * 3/1993 Abramov ............ B42F 15/0064 281/43
5,199,809 A 4/1993 Semerjian
5,255,798 A * 10/1993 Aaldenberg ........... A47B 45/00 312/184
5,261,636 A 11/1993 Hawes, Jr.
5,275,439 A 1/1994 Hawes, Jr.
5,295,622 A 3/1994 Lorber
5,328,259 A * 7/1994 Meriaux ............. B42F 15/0035 229/67.2
5,393,136 A * 2/1995 Grabowski ......... B42F 15/0094 211/175
5,393,154 A * 2/1995 Hubbell .............. B42F 15/0064 402/80 R
5,405,020 A 4/1995 Fotioo
5,411,355 A * 5/1995 Gosnell ..................... B60P 7/14 410/139
5,439,280 A 8/1995 Steinberg
5,515,980 A * 5/1996 Fotioo ................. B42F 15/0094 211/189
5,529,183 A 6/1996 Nishikawa
5,676,439 A 10/1997 Occhipinti
5,692,673 A 12/1997 De Safey
5,722,692 A 3/1998 Abramov
5,738,319 A 4/1998 Grassi
5,772,020 A 6/1998 Hara
5,899,626 A 5/1999 Hatano
5,941,450 A 8/1999 De Safey
5,942,293 A 8/1999 Occhipinti et al.
5,944,423 A 8/1999 Rabin et al.
D415,950 S 11/1999 Anderson
5,993,099 A 11/1999 Greenberg et al.
D417,697 S 12/1999 Long et al.
6,273,470 B1 8/2001 Bullock
6,543,737 B2 4/2003 Decker et al.
6,550,874 B2 4/2003 Walla et al.
6,557,701 B1 5/2003 Chen
6,588,060 B1 7/2003 Arentsen
6,619,773 B2 9/2003 Amsterdam
6,626,602 B1 * 9/2003 Yuen ....................... B42F 15/06 281/43

(56) References Cited

U.S. PATENT DOCUMENTS

| | | | | |
|---|---|---|---|---|
| 6,629,807 | B2 * | 10/2003 | Bernardo | B61D 45/006 410/129 |
| D494,050 | S | 8/2004 | Klein | |
| 7,059,483 | B2 | 6/2006 | Scudder | |
| D527,048 | S | 8/2006 | Scudder | |
| 7,100,775 | B2 * | 9/2006 | Yeh | B42F 15/0047 402/3 |
| D546,647 | S | 7/2007 | Gullicks et al. | |
| D584,939 | S | 1/2009 | Snell | |
| 7,614,511 | B2 * | 11/2009 | Konstant | A47B 47/028 211/192 |
| 7,727,166 | B2 * | 6/2010 | Fowler | A61B 5/150458 600/583 |
| 8,758,267 | B2 * | 6/2014 | Fowler | A61B 5/150503 600/583 |
| D837,295 | S | 1/2019 | Decarlo et al. | |
| D839,721 | S | 2/2019 | Downey et al. | |
| D871,987 | S | 1/2020 | Ness et al. | |
| D887,257 | S | 6/2020 | Becker | |
| D900,599 | S | 11/2020 | Goodfellow et al. | |
| 2003/0038565 | A1 | 2/2003 | Walla | |
| 2005/0199685 | A1 | 9/2005 | Mark | |
| 2005/0205650 | A1 | 9/2005 | Founds | |
| 2006/0097031 | A1 | 5/2006 | Hoogland | |
| 2006/0124480 | A1 | 6/2006 | Menard | |
| 2006/0226205 | A1 | 10/2006 | O'Leary | |
| 2006/0242869 | A1 | 11/2006 | Bunger | |
| 2008/0164302 | A1 | 7/2008 | Ho | |
| 2009/0101605 | A1 | 4/2009 | Goodfellow | |
| 2017/0120667 | A1 | 5/2017 | Goodfellow | |
| 2018/0056703 | A1 | 3/2018 | Goodfellow | |
| 2020/0147994 | A1 | 5/2020 | Cocco | |
| 2020/0171876 | A1 | 6/2020 | Goodfellow | |
| 2021/0146713 | A1 | 5/2021 | Goodfellow et al. | |

FOREIGN PATENT DOCUMENTS

| | | |
|---|---|---|
| FR | 2411092 A1 | 7/1979 |
| JP | 03024997 | 2/1991 |
| JP | H0324997 A | 2/1991 |

OTHER PUBLICATIONS

United States Patent and Trademark Office, "Response to Restriction / Election Filed," issued in connection with U.S. Appl. No. 11/877,045, mailed on Oct. 1, 2009, 1 page.

United States Patent and Trademark Office, "Non-Final Office Action," issued in connection with U.S. Appl. No. 11/877,045, mailed on Oct. 16, 2009, 16 pages.

United States Patent and Trademark Office, "Final Office Action," issued in connection with U.S. Appl. No. 11/877,045, mailed on Apr. 14, 2010, 16 pages.

State Intellectual Property Office of the People's Republic of China, "Notification of the First office action", issued in connection with Chinese patent application No. 200810170099.4, dated Jan. 30, 2011, 11 pages.

United States Patent and Trademark Office, "Requirement for Restriction / Election", issued in connection with U.S. Appl. No. 15/800,487, dated Feb. 14, 2018, 6 pages.

United States Patent and Trademark Office, "Non-Final Office Action," issued in connection with U.S. Appl. No. 11/877,045, mailed on Feb. 2, 2011, 22 pages.

Chinese Application No. 200810170099.4, Second Office Action dated Jul. 11, 2011 (4 pages) & English translation (4 pages).

United States Patent and Trademark Office, "Final Office Action," issued in connection with U.S. Appl. No. 11/877,045, mailed on Oct. 27, 2011, 26 pages.

Rejection Decision of Chinese Appl. No. 200810170099.4 dated Mar. 5, 2012 (4 pages Chinese with 4 pages of English Translation).

United States Patent and Trademark Office, "Non-Final Office Action," issued in connection with U.S. Appl. No. 11/877,045, mailed on Feb. 28, 2013, 37 pages.

United States Patent and Trademark Office, "Notice of Allowance," issued in connection with U.S. Appl. No. 11/877,045, mailed on Nov. 4, 2016, 7 pages.

United States Patent and Trademark Office, "Non-Final Office Action", issued in connection with U.S. Appl. No. 15/407,688, dated Feb. 24, 2017, 10 pages.

United States Patent and Trademark Office, "Notice of Allowance" issued in U.S. Appl. No. 17/714,706 on Nov. 15, 2023 (2 pages).

United States Patent and Trademark Office, "Final Office Action", issued in connection with U.S. Appl. No. 15/407,688, dated Apr. 28, 2017, 13 pages.

United States Patent and Trademark Office, "Notice of Allowance and Fee(s) Due", issued in connection with U.S. Appl. No. 15/407,688, dated Jul. 6, 2017, 6 pages.

United States Patent and Trademark Office, "Non-Final Rejection" issued in connection with U.S. Appl. No. 15/800,487, dated Aug. 2, 2018, 9 pages.

United States Patent and Trademark Office, "Final Office Action", issued in connection with U.S. Appl. No. 15/800,487, dated Nov. 26, 2018, 12 pages.

United States Patent and Trademark Office, "Advisory Action", issued in connection with U.S. Appl. No. 15/800,487, dated Mar. 18, 2019, 3 pages.

United States Patent and Trademark Office, "Non-Final Office Action", issued in connection with U.S. Appl. No. 15/800,487, dated Jul. 29, 2019, 10 pages.

United States Patent and Trademark Office, "Final Office Action", issued in connection with U.S. Appl. No. 15/800,487, dated Jan. 28, 2020, 15 pages.

United States Patent and Trademark Office, "Requirement for Restriction / Election", issued in connection with U.S. Appl. No. 16/785,178, dated Mar. 26, 2020, 5 pages.

United States Patent and Trademark Office, "Notice of Allowance" issued in connection with U.S. Appl. No. 15/800,487, dated Apr. 8, 2020, 6 pages.

United States Patent and Trademark Office, "Non-Final Office Action", issued in connection with U.S. Appl. No. 16/785,178, dated May 14, 2020, 11 pages.

United States Patent and Trademark Office, "Notice of Allowance", issued in connection with U.S. Appl. No. 29/725,608, dated Jul. 1, 2020, 5 pages.

United States Patent and Trademark Office, "Final Office Action", issued in connection with U.S. Appl. No. 16/785,178, dated Aug. 18, 2020, 10 pages.

United States Patent and Trademark Office, "Notice of Allowance", issued in connection with U.S. Appl. No. 16/785,178, dated Oct. 27, 2020, 5 pages.

United States Patent and Trademark Office, "Decision on Appeal", issued in connection with U.S. Appl. No. 11/877,045, mailed on Oct. 24, 2016, 12 pages.

United States Patent and Trademark Office, "Non-Final Office Action," issued in connection with U.S. Appl. No. 17/156,111, mailed on Oct. 5, 2021, 9 pages.

United States Patent and Trademark Office, "Record of Oral Hearing", issued in connection with U.S. Appl. No. 11/877,045, mailed on Oct. 13, 2016, 14 pages.

United States Patent and Trademark Office, "Notice of Allowance," issued in connection with U.S. Appl. No. 17/156,111, mailed on Jan. 5, 2022, 6 pages.

United States Patent and Trademark Office, Examiner's Answer to Appeal Brief, issued in connection ,vith U.S. Appl. No. 11/877,045, mailed on Dec. 23, 2013, 23 pages.

United States Patent and Trademark Office, "Restriction Requirement", issued in connection with U.S. Appl. No. 11/877,045, mailed on Sep. 21, 2009, 7 pages.

United States Patent and Trademark Office, "Non-Final Action" issued in U.S. Appl. No. 17/714,706 on May 2, 2023 (11 pages).

United States Patent and Trademark Office, "Notice of Allowance" issued in U.S. Appl. No. 17/714,706 on Aug. 9, 2023 (6 pages).

* cited by examiner

RODS FOR USE WITH HANGING FILE HOLDERS

RELATED APPLICATIONS

This patent is a continuation of U.S. patent application Ser. No. 17/714,706, filed on Apr. 6, 2022, and entitled "Rods for Use with Hanging File Folders," which is a continuation of U.S. patent application Ser. No. 17/156,111, filed on Jan. 22, 2021, and entitled "Rods for Use with Hanging File Folders," which is a continuation of U.S. patent application Ser. No. 16/785,178, filed on Feb. 7, 2020, and entitled "Rods for Use with Hanging File Folders," which is a continuation of U.S. patent application Ser. No. 15/800,487, filed on Nov. 1, 2017, and entitled "Resilient Rods for Use with Hanging File Folders," which is a continuation of U.S. patent application Ser. No. 15/407,688, filed on Jan. 17, 2017, and entitled "Resilient Rods for Use with Hanging File Folders," which is a continuation of U.S. patent application Ser. No. 11/877,045, filed on Oct. 23, 2007, entitled "Resilient Rod Feature in Hanging File Folder." U.S. patent application Ser. No. 17/714,706; U.S. patent application Ser. No. 17/156,111; U.S. patent application Ser. No. 16/785,178; U.S. patent application Ser. No. 15/800,487; U.S. patent application Ser. No. 15/407,688; and U.S. patent application Ser. No. 11/877,045 are hereby incorporated by reference in their entireties.

TECHNICAL FIELD

This disclosure is generally related to hanging file folders for mounting to a pair of spaced apart rails. More specifically, the present disclosure is related to rods for hanging file folders with a structure for permitting adjustment of an effective length for accommodating variances when adjusting folders along spaced apart rails.

BACKGROUND

Hanging file folders for holding papers and documents within a pocket in a filing cabinet with parallel, spaced apart rails are known in the art. However, some hanging file folders tend to have a limited amount of strength and may not provide ease for sliding the folders along the length of rail when holding documents.

For example, as the load within the pocket of a file folder increases, the hooks and rods for hanging the file folder require increased strength in order to provide suitable engagement with the rails of a filing cabinet or the like. The hooks and rods must also be designed to resist derailing of the file folder from the rails. For example, as the load increases, a file folder may be twisted or flexed and may lock onto the rail. Thus, file folders with increased strength and better engagement with the rails of a filing cabinet are beneficial.

Additionally, the spaced apart rails within cabinets may not be provided perfectly at the same distance. For example, rails within a filing cabinet may not be parallel or may not be spaced the same distance from one another in one drawer or cabinet as compared to another. Also, file folders generally hang perpendicular to the rails when at rest. FIG. 1 illustrates an overhead view of hanging file folders 4, 6 on a pair of spaced rails 2 in a drawer (not shown), for example. The file folder 4 hangs via hooks at points A and B in a perpendicular direction with respect to the rails. However, when the file folders are moved or adjusted along the rails, such as file folder 6, the file folder may be pushed at an angle with respect to the rails, as shown by folder 6 hanging by hooks at points C and D. A greater distance or span is thereby created between the hooks of the rod during adjustment and sit between the rails 2. The file folder (or the hooks of the rail of the file folder) may then tend to dislodge or come off of the rail entirely. For example, a file folder may have a "derailing angle" (i.e., the angle at which at least one of the hooks on a rod dislodges from the rail) of less than or equal to 15 degrees with respect to the spaced apart rails 2. Thus, it may be difficult to hang and adjust or slide file folders along such rails without having the folders come off the rails.

DETAILED DESCRIPTION

Figure 9A:
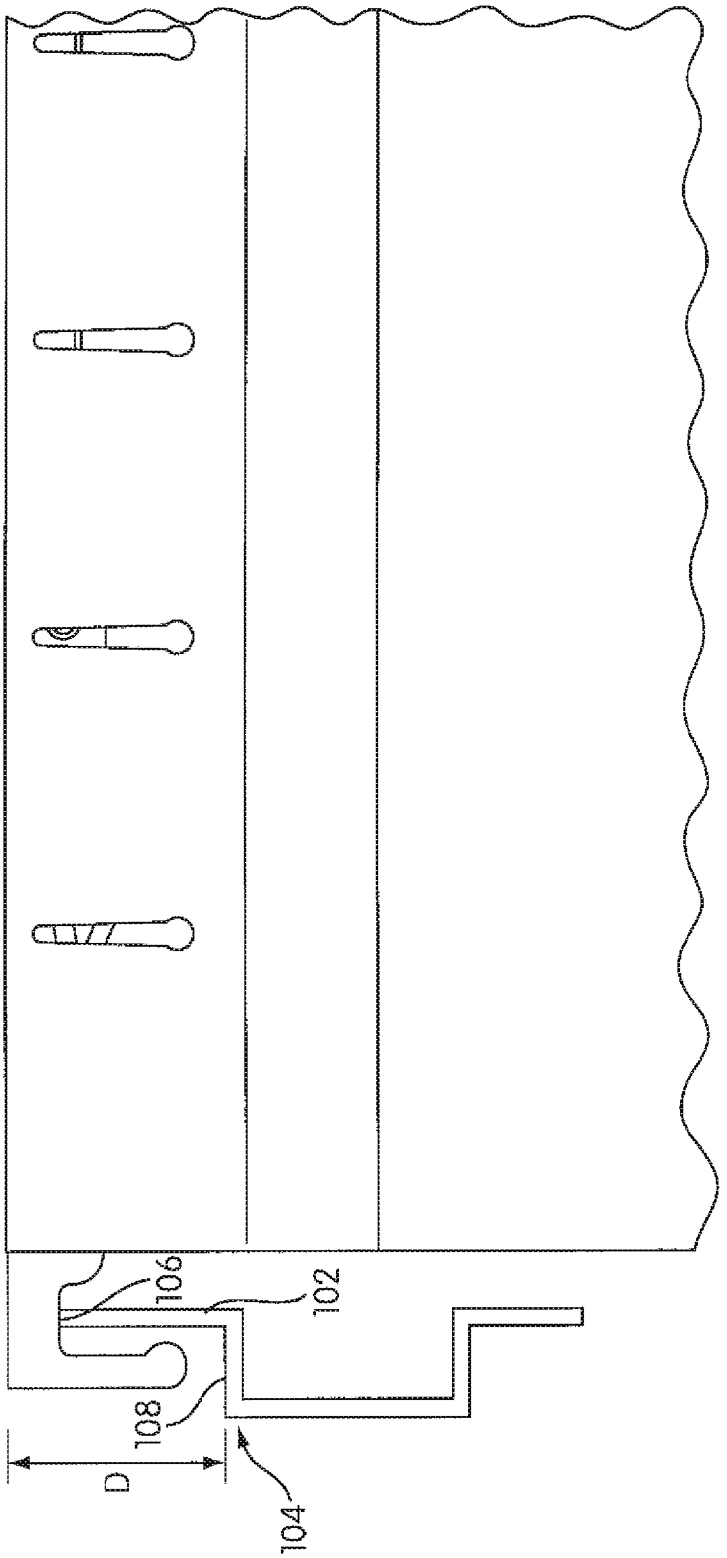
FIGS. 9*a*, 9*b* and 9*c* illustrate a perspective, front detailed perspective, and back detailed perspective view, respectively, of a rod with a reinforcing rib for use with the hook assembly in accordance with an embodiment of the present disclosure.
Figure 9B:
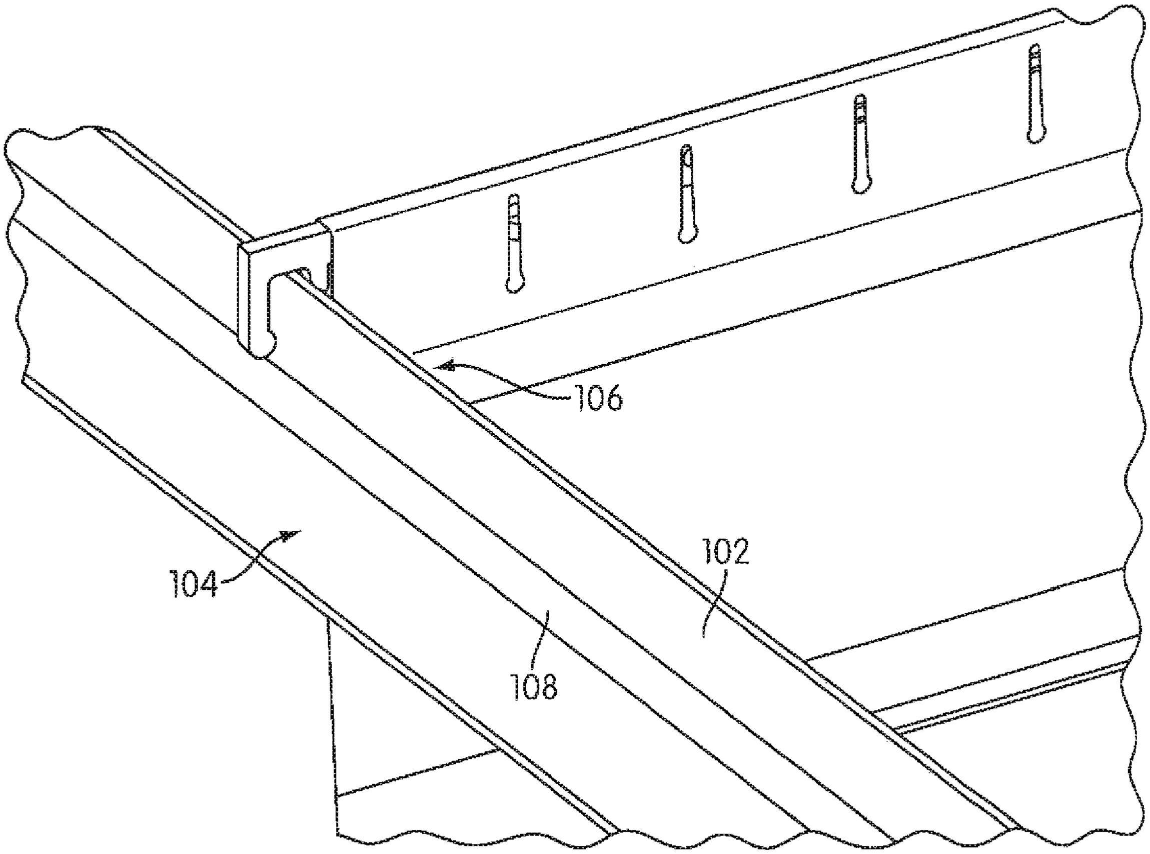
Figure 9C:
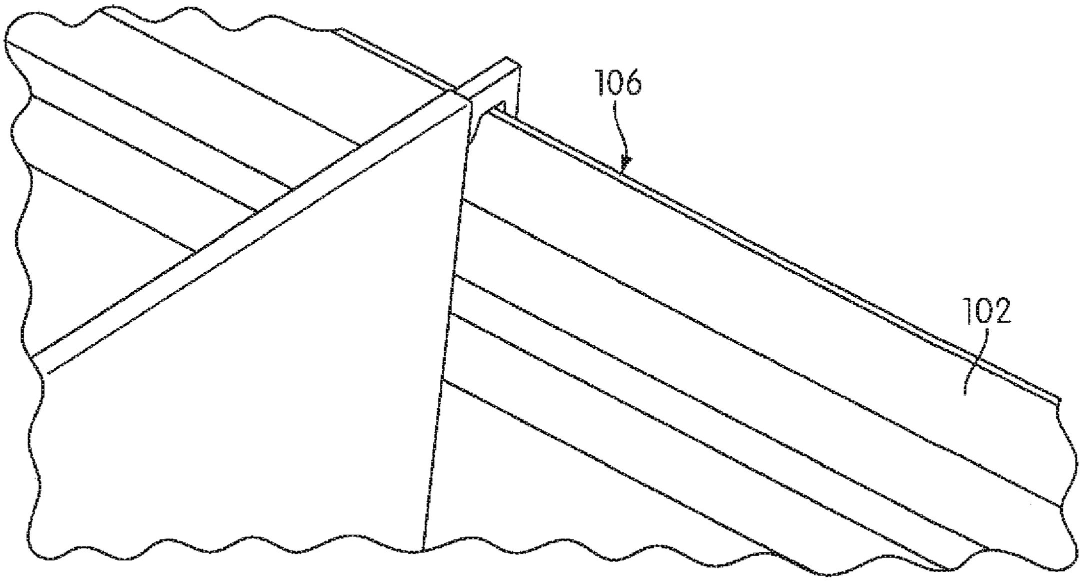

Generally, file folders may be laterally or perpendicularly hung on spaced apart rails provided within a drawer of a filing cabinet. As known in the art, file folders may be mounted on spaced apart rails running generally parallel with the length of the drawer or on spaced apart rails that may run parallel to the width of the drawer. For the herein disclosed embodiments, any type of rail system may be used. For example, as shown in FIGS. 9*a*-9*c*, a rail 102 with a reinforcing rib 104 may be used in a drawer (not shown) of a filing cabinet. The reinforcing rib 104 provides strength to the rail 102 so as to prevent bending of the body of the rail. In an embodiment, the reinforcing rib 104 may be formed uniformly as a single unit with the rail 102. As shown, the reinforcing rib 104 may be provided a distance D from the top 106 or contact point of a rail 102 to the top 108 of the reinforcing rib 104.

Figure 10:
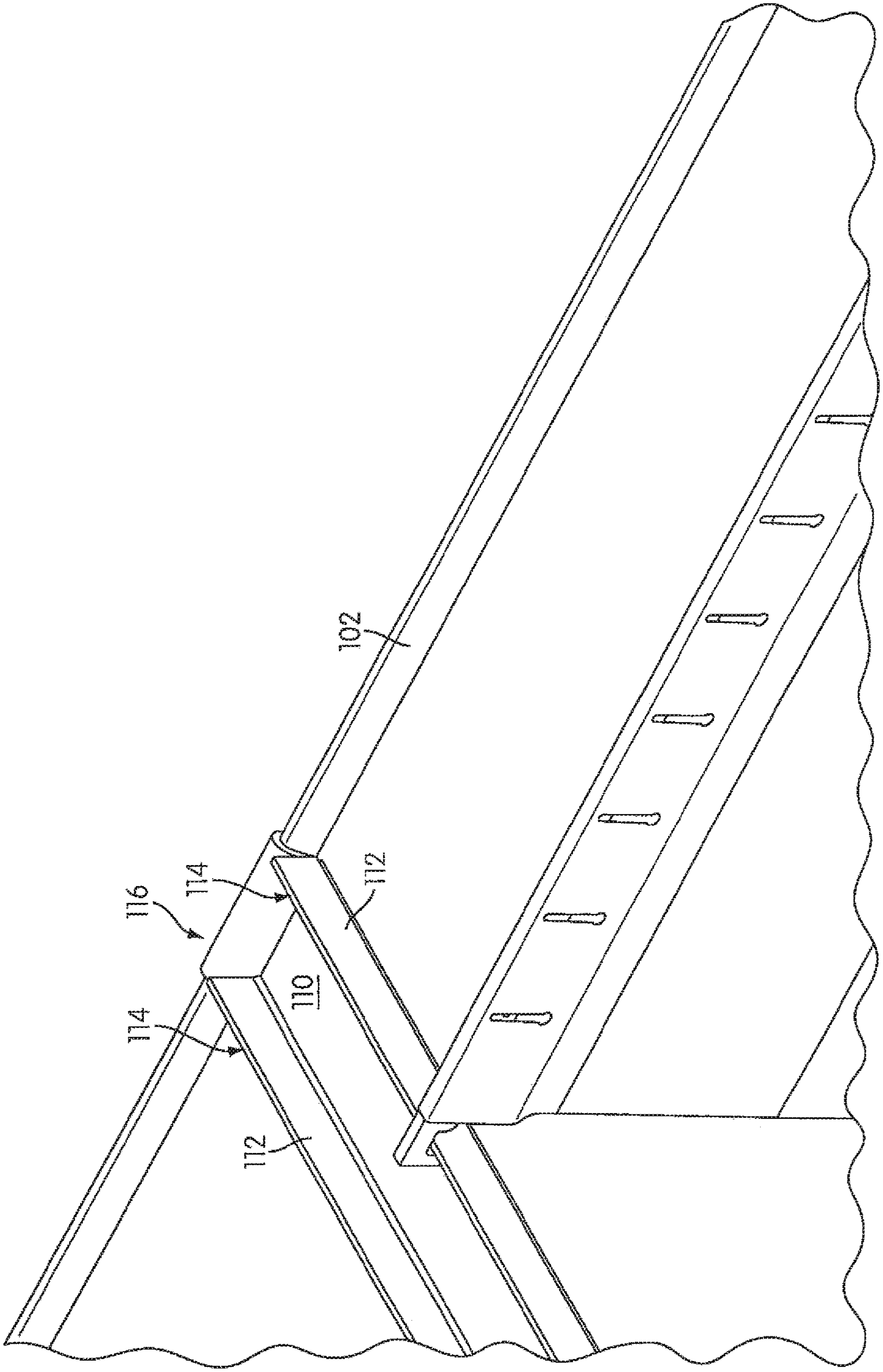
FIG. 10 illustrates an example of a channel with a rail that may be used in a file cabinet and with the hook assembly in accordance with an embodiment of the present disclosure.

As another example, FIG. 10 illustrates an embodiment wherein a channel 110 comprising a rail 112 may be used for hanging file folders. As shown, the channel 110 is shaped such that at least one extended rail 112 with a top 114 or contact surface is formed for receiving a hook of a rod of a file folder to hang thereon. In an embodiment, the channel 110 comprises a first attachment end 116 and a second attachment end (not shown) such that channel 110 may be mounted perpendicularly on the spaced apart rails (only one rail 102 of which is shown) of a file drawer. By attaching the ends of the channel 110 to the spaced apart rails in a drawer, file folders may be hung or mounted in an opposite or perpendicular direction (e.g., than originally intended).

Nonetheless, the above rails as shown in FIGS. 9*a*-9*b* and 10 are exemplary and should not be limited to those disclosed. The hanging file folder 10 and/or the hook and rod assembly 30 as described herein may be used with any type of rail system for mounting or hanging file folders, magazines or newspapers, or other objects as will be further described and should not be limited hereto.

One example aspect of the disclosure provides a hanging file folder for mounting to a pair of spaced apart rails. The hanging file folder includes a first rod with a pair of hook portions on opposing ends thereof for engaging the pair of spaced apart rails; a second rod with a pair of hook portions on opposing ends thereof for engaging the pair of spaced apart rails; and a file folder body with first and second walls forming a pocket for holding materials therein. The first wall of the file folder body is connected to the first rod, and the second wall of the file folder body is connected to the second rod, such that the pocket is suspended between the first and second rods. At least one of the first and second rods has a resilient structure for permitting at least one of the hook portions thereof to move longitudinally and adjust an effective length of its rod for accommodating variances in the angle at which folders are mounted on the rails and maintaining engagement therewith.

Another example aspect of the disclosure provides a method of forming a hanging file folder for mounting to a pair of spaced apart rails. The method includes forming a first rod with a pair of hook portions on opposing ends thereof; forming a second rod with a pair of hook portions on opposing ends thereof; attaching a first wall of a file folder body to the first rod; and attaching a second wall of the file folder body to the second rod. At least one of the rods includes a resilient structure for permitting at least one of the hook portions thereof to move longitudinally and adjust an effective length of its rod for accommodating variances in the angle at which the folders are mounted on the rails to maintain engagement therewith.

Another example aspect of the disclosure includes a rod for mounting to a pair of spaced apart rails. The rod includes an elongated body for hanging an object therefrom. The body has a first end and a second end. A pair of hook portions are provided on opposing ends of the rod for engaging the pair of spaced apart rails, and a resilient structure is provided to permit at least one of the pair of hook portions to move longitudinally with respect to the elongated body. An effective length of the body is adjusted to accommodate variances in the angle at which the rod is mounted on the rails and to maintain engagement therewith.

Other objects, features, and advantages of the present disclosure will become apparent from the following detailed description, the accompanying drawings, and the appended claims.

Figure 2:
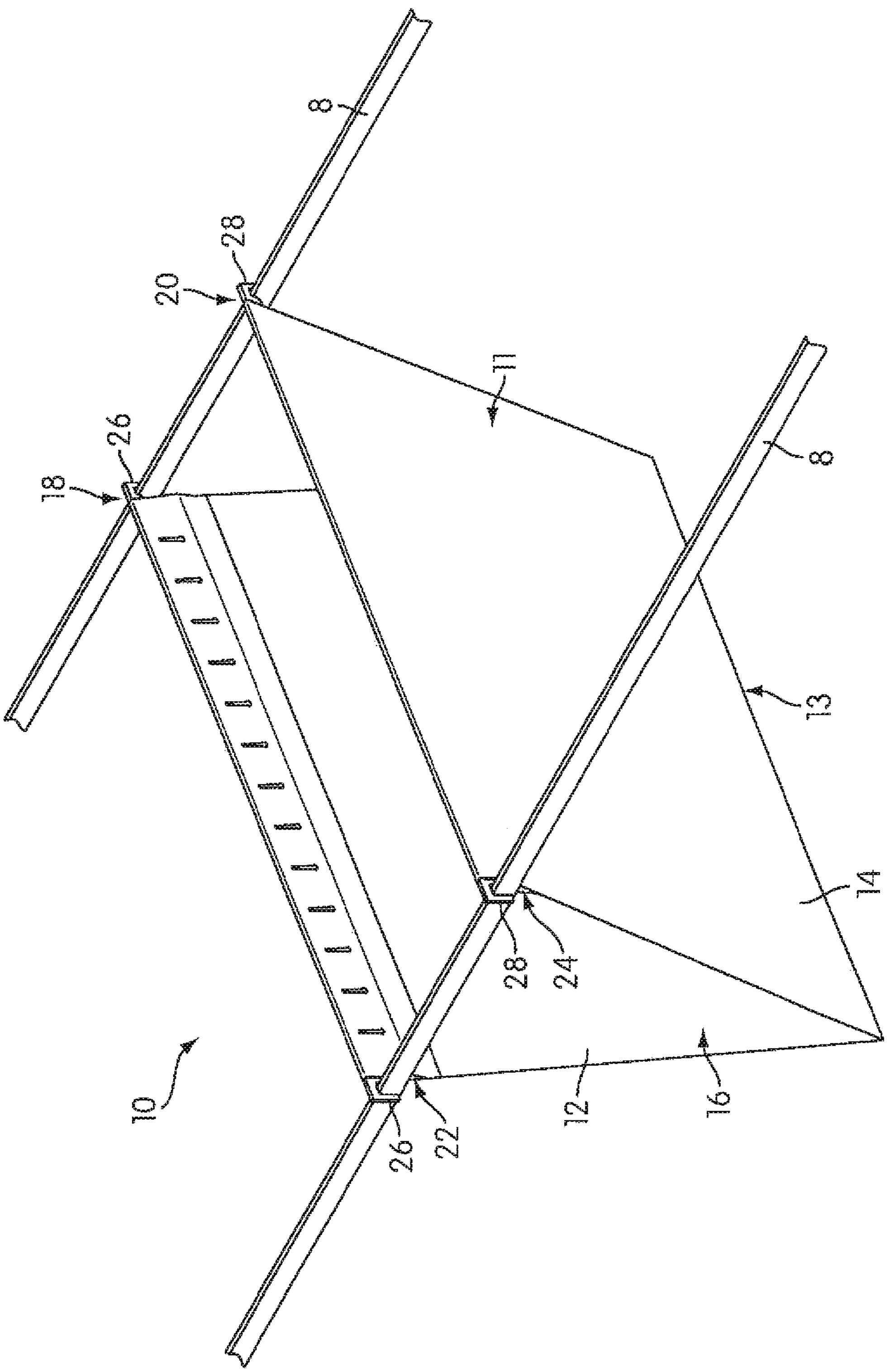
FIG. 2 illustrates a hanging file folder for mounting to a pair of spaced apart rails in accordance with an embodiment of the present disclosure.

Turning back to the figures, FIG. 2 illustrates a hanging file folder 10 for mounting to a pair of spaced apart rails 8 in a drawer of a filing cabinet, for example. As shown, file folder 10 has a body 11 comprising a first wall 12 and second wall 14 that forms a pocket 16 for holding materials therein. The pocket 16 of the file folder 10 is designed to hold papers, documents and the like of various shapes and sizes, for example.

The first wall 12 of the body 11 is connected to a first rod 18 and the second wall 14 of the body 11 is connected to a second rod 20. A bottom end of first wall 12 is connected to a bottom end of the second wall 14 of the body 11 of the file folder 10 at 13, thus forming a pocket 16 therebetween. The pocket 16 of the folder 10 is designed such that it is suspended between the first and second rods 18, 20. The folder 10 may be connected to the rods 18, 20 in any number of ways. For example, in an embodiment, an open end 22 of the first wall 12 and an open end 24 of the second wall 14 may be designed such that they surround the first rod 18 and second rod 20, respectively (e.g., as shown in FIG. 2). The ends 22, 24 may comprise rod pockets designed to receive the rods 18, 20, for example. In an embodiment, the rods 18, 20 may be designed such that the ends 22, 24 of the first wall 12 and second wall 14 are captured within or connected to the rods 18, 20 (e.g., as farther described with reference to FIG. 5*c*). Generally, the method of connecting the rods 18, 20 to the body 11 of the file folder 10 may be performed in any manner and therefore should not be limited to those as described herein.

FIG. 2 also shows the first rod 18 and second rod 20 with a pair of hook portions 26 and 28, respectively, on opposing ends thereof. The hook portions 26, 28 are provided to engage a pair of spaced apart rails 8 in a filing cabinet or the like. In accordance with an embodiment of the present disclosure, at least one of the first and second rods 18, 20 comprises a resilient structure for permitting at least one of the hook portions 26, 28 thereof to move longitudinally, thus adjusting an effective length of the rod body 18, 20. Additionally, when the file folders are moved or adjusted along the rails, the effective length of the rod body 18, 20 is adjusted to prevent the possibility of dislodging or coming off of the rail 8 when moving the file folder along the rail 8 (e.g., such as when opening the walls 12, 14 of the body 11 of the file folder 10 to access contents in the pocket 16 therein, or when moving a file folder 10 to access an additional folder). The use of the resilient structure with the rod and hook portions, as will be further described, thereby accommodates variances in the angle at which the folders are mounted on the rails, for example, and maintains engagement of the rod and hook portions with the rails. Additional features and advantages will become further evident below.

Figure 3:
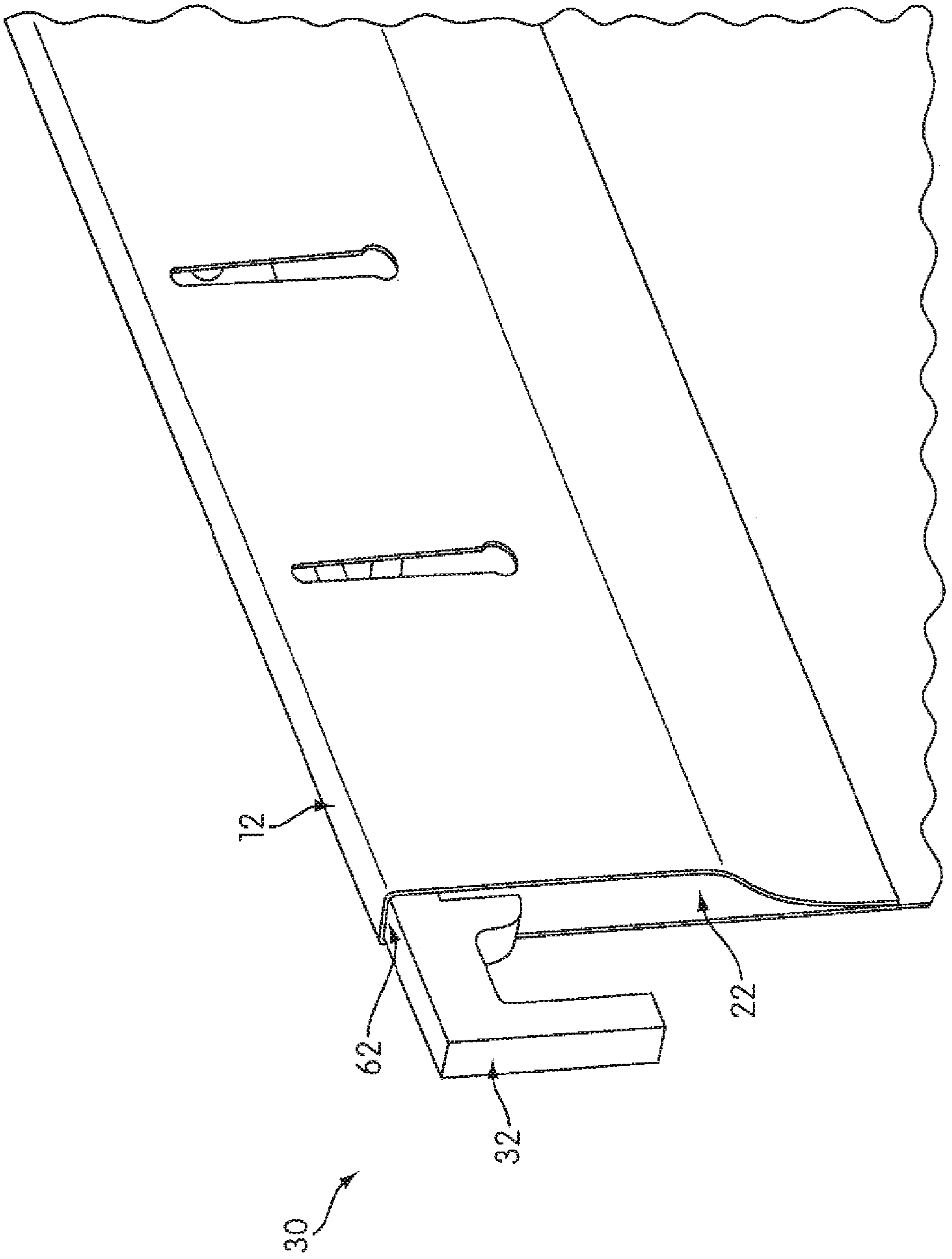
FIG. 3 illustrates a detailed view of an end of the hanging file folder of FIG. 2 with a hook and rod assembly in accordance with an embodiment of the present disclosure.

FIG. 3 illustrates a detailed view of the end 22 of first wall 12 of the hanging file folder 10 of FIG. 2 with a hook and rod assembly 30 in accordance with an embodiment of the present disclosure. The hook and rod assembly 30 is surrounded by end 22 (or provided through the rod pocket 22) of the first wall 12 of the file folder 10. The end 22 of first wall 12 is herein described for illustrative purposes only and should not be limiting, i.e., the hook and rod assembly 30 may be used with first wall 12, second wall 14, or both. In an embodiment, the hook and rod assembly 30 as herein described may be used on one or both opposing ends of the first and/or second rods 12, 14. In an embodiment, at least one hook of the pair of hook portions 26 and/or 28 may comprise a hook and rod assembly 30.

The hook and rod assembly 30 comprises a hook portion 32 and a rod portion 62. In an embodiment, hook and rod assembly 30 may be formed as a single unit. In an embodiment, at least one of the first and second hook portions 32 of the assembly 30 may be removably attached to the first and second rods 18, 20 or rod portions 62.

Figure 4A:
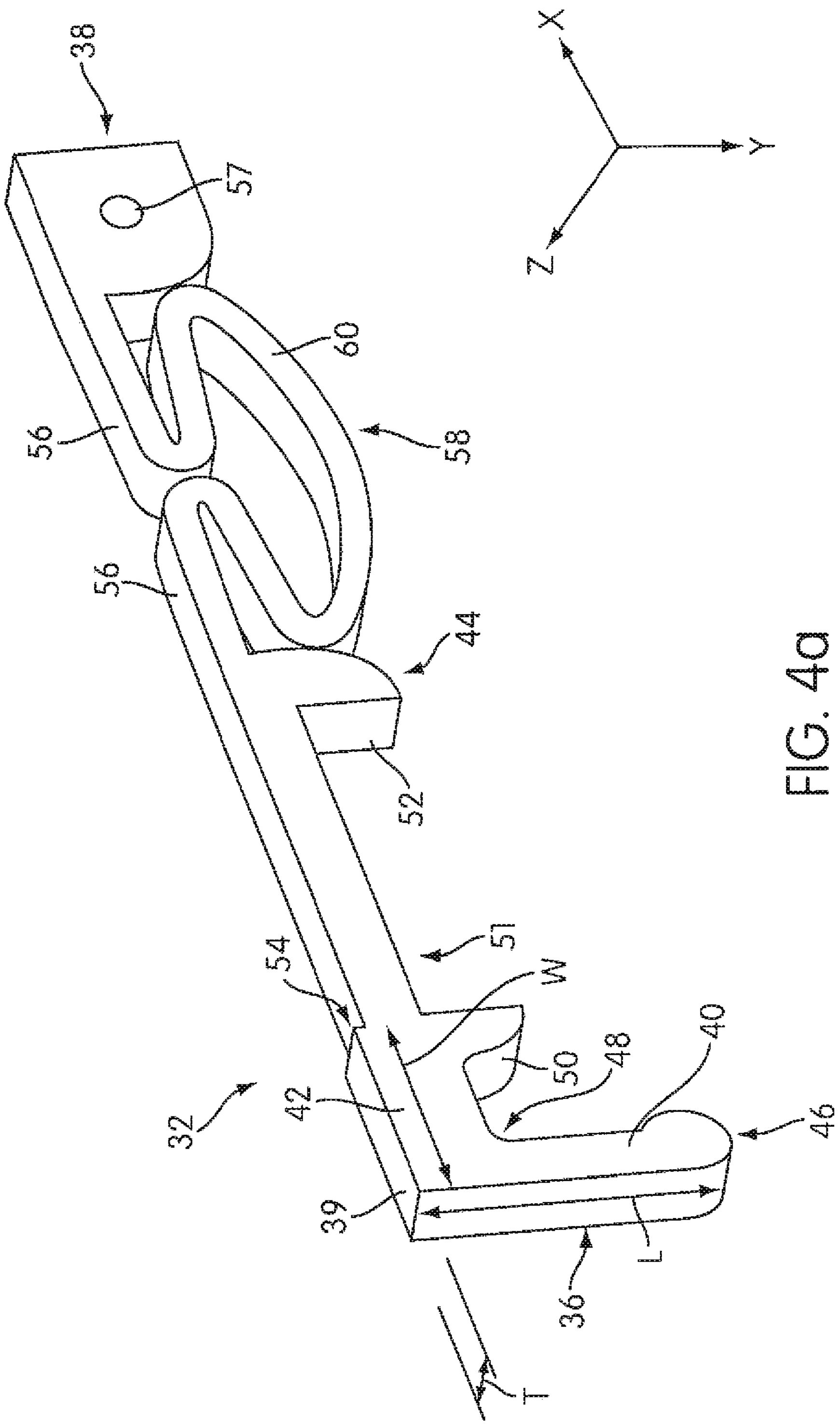
FIG. 4*a* illustrates the hook portion of FIG. 3 in accordance with an embodiment of the present disclosure.

FIG. 4*a* illustrates an example of the removably attached hook portion 32 of FIG. 3 in further detail. As shown and will be further described, in an embodiment, the hook portion 32 may be moveably mounted with respect to rod portion 62. Hook portion 32 comprises a proximal end 36 and a distal end 38. Proximal end 36 comprises a hook 39 for surrounding a rail 8 (as shown in FIG. 2).

In an embodiment, hook 39 comprises an elongated portion 40 and a longitudinal portion 42. Elongated portion 40 of hook 39 also comprises an end portion 46. In an embodiment, elongated portion 40 may comprise a bulbous end portion 46, as shown in FIG. 4*a*. For example, bulbous portion 46 may be provided near the end of the hook 39 in order to aid in keeping the hook portion 32 of the hook and rod assembly 30 on a rail. The elongated portion 40 transitions into the longitudinal portion 42 via a curved or radiused portion 48. The curved portion 48 is provided along the underside of the longitudinal portion 42 of the hook portion 32. The curved portion 48 is formed such that it comes into contact with a rail for hanging the file folder 10. In an embodiment, the curved portion 48 comprises a variable radius for preventing excessive contact with the rail.

Longitudinal portion 42 extends into a hook body 44. The end of longitudinal portion 42 transitions into hook body 44 and includes an extension portion 50 and an abutment portion 54. Extension portion 50 is formed such that it comes into contact with an opposite (i.e., inner) side of a rail when hanging file folder 10. In an embodiment, as shown in FIG. 4*a*, extension portion 50 may comprise a rounded surface or variable radius for preventing excessive contact with the rail. Abutment portion 54 is provided such that it sits adjacently against an edge of the rod portion 62 when assembled (as will be described with reference to FIG. 4*c*).

The hook body 44 may also comprise a limiting portion 52. In an embodiment, the limiting portion 52 is provided as a stop for limiting the amount of longitudinal movement of the hook portion 32 with respect to rod portion 62. The area 51 between the extension portion 50 and limiting portion 52 provides a bearing surface for the hook portion 32 to move or slide on a part of the rod, as will be discussed in greater detail below. Thus, limiting portion 52 limits the length the bearing surface 51 may move with respect to the rod 62.

Figure 11A:
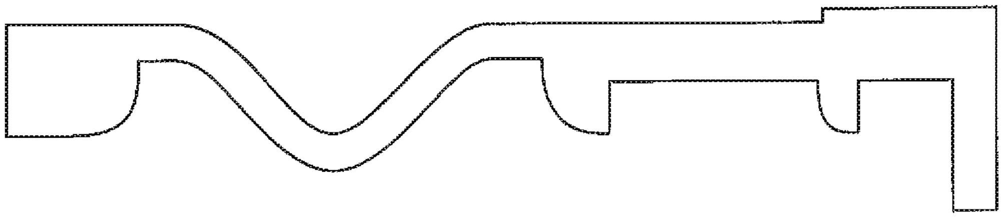
FIGS. 11*a*-11*c* illustrate examples of alternate designs for a resilient mechanism that may be used with a hook and rod assembly in accordance with an embodiment.
Figure 11B:
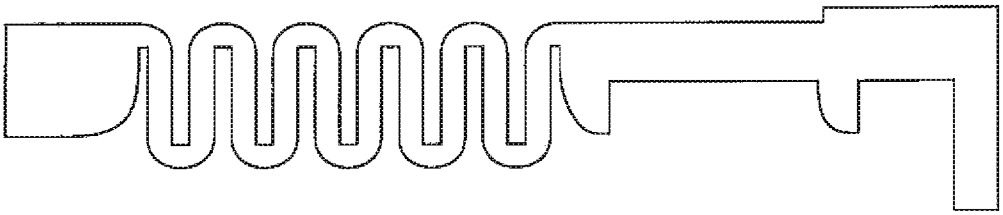
Figure 11C:
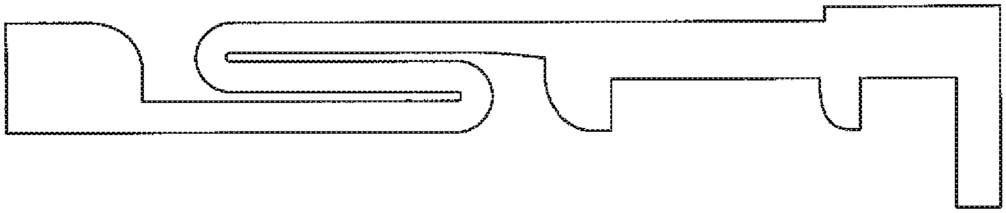

As previously noted, at least one of the first and second rods may have at least one hook portions thereof moveably mounted to the rod portion 62. In an embodiment, the resilient structure is constructed and arranged between the rod 62 and the hook 39 near the distal end 38 of hook portion 32. In an embodiment, the hook body 44 of hook portion 32 comprises a resilient structure 58 as shown in FIG. 4*a*. In an embodiment, resilient structure 58 comprises a tension spring. As shown, in an embodiment, the resilient structure 58 or spring may comprise a rounded shape, much like the Greek letter Omega, with first and second legs 56 joined at 60. In an embodiment, resilient structure may comprise a "U"-shape, "V"-shape, "W"-shape, or any other known shapes for providing resiliency where angular deflection of at least one member may occur. FIGS. 11*a*-11*c* illustrate examples of alternate designs for a resilient mechanism that may be used with a hook and rod assembly in accordance with an embodiment. For example, as noted above, FIG. 11*a* illustrates an example of a resilient structure comprising a "V"-shape. FIG. 11*b* illustrates an example of resilient structure comprising a "snake"-like shape comprising a plurality of curves. FIG. 11*c* illustrates an example of a resilient structure comprising an "S"-shape. Likewise, the resilient structure 58 may also comprise a member made from a resilient material permitting elongation thereof.

In an embodiment, the resilient structure 58 may be formed integrally as one continuous piece with the hook portion 32. For example, in an embodiment, the hook portion 32 is formed through a stamping, punching, or molding process. In an embodiment, hook portion 32 may be formed of nylon. The hook portion 32 may be of any known length. The elongated portion 40 of the hook 39 of hook portion 32 may be designed to extend below the height of a rail, for example. In an embodiment, the length (e.g., length L of the elongated portion 40 from the top of longitudinal portion 42 to the end portion 46 along Y-axis, as indicated in FIG. 4*a*) of the hook portions 32 may comprise a length L designed to accommodate the distance D from the top 106 of a rail 102 in a file cabinet to the top 108 of a reinforcing rib 104 of the rail 102, as shown in FIGS. 9*a* and 9*b*. In an embodiment, the length L and width W (e.g., length of longitudinal portion 42 from the abutment portion 54 to the elongated portion 40 along the X-axis, as indicated in FIG. 4*a*) of the hook portion 32 may be defined by a window comprising the distance from a rail to the inside of a file cabinet. In an embodiment, the window may comprise approximately 9.6 millimeters (mm) by approximately 11.5 millimeters (mm).

In an embodiment, hook portion 32 may comprise a depth or thickness T of 2 millimeters (mm) and a length L of 9.6 millimeters (mm). In an embodiment, the hook portion 32 may comprise a thickness T to minimize the impact of the drawer space used by the file folder 10. That is, the thickness T may be adjusted such that a drawer may hold more file folders based on the depth or thickness of the hook. For example, a drawer may be designed to hold eighty (80) file folders. However, by adjusting the depth or thickness T of the hook in the Z-direction (i.e., along Z-axis, as indicated in FIG. 4*a*), the same drawer may hold one hundred (100) file folders.

The distance of the bearing surface 51 is set to limit the extension of the resilient structure 58. For example, the distance of the bearing surface 51 may be determined by a distance needed to extend the file folder. In an embodiment, the distance of the bearing surface 51 may also be determined by the amount of flexure or "flex" that would cause the resilient structure 58 to permanently yield (i.e., experience plastic deformation). In an embodiment, the amount of flex may be determined or affected by the material used to form resilient structure 58. For example, a material such as nylon may bend more than a high density polyethylene (HDPE) before yielding. In an embodiment, resilient structure 58 may comprise the material of which the hook portion 32 comprises. In an embodiment, the resilient structure 58 may comprise nylon or HDPE, for example. In an embodiment, the resilient structure 58 may comprise a spring steel.

The distal end 38 of hook portion 32 may also comprise an attachment feature such as a mounting portion 57. FIG. 4*a* illustrates a mounting portion 57 (e.g., an opening) on the distal end 38 of the hook body 44. The mounting portion 57 is designed to mount or hold the hook portion 32 within the rod portion 62. In an embodiment, mounting portion 26 of hook portion 32 may comprise a female portion and rod 62 may comprise a male portion, wherein when the hook portion(s) 32 are connected to the opposing ends of the rod 62, the male and female portions mate to secure the hook portion(s) 32 to the rod 62. In an embodiment, the mounting portion 57 may comprise a hole or opening for receiving an extended portion or pin located on the rod portion 62, for example, as shown in the Figures. The mounting portion 57 assists in keeping the hook portion 32 within the rod portion 62 and may also assist in limiting the amount of movement of the hook portion 32 with respect to the rod portion 62.

Figure 4B:
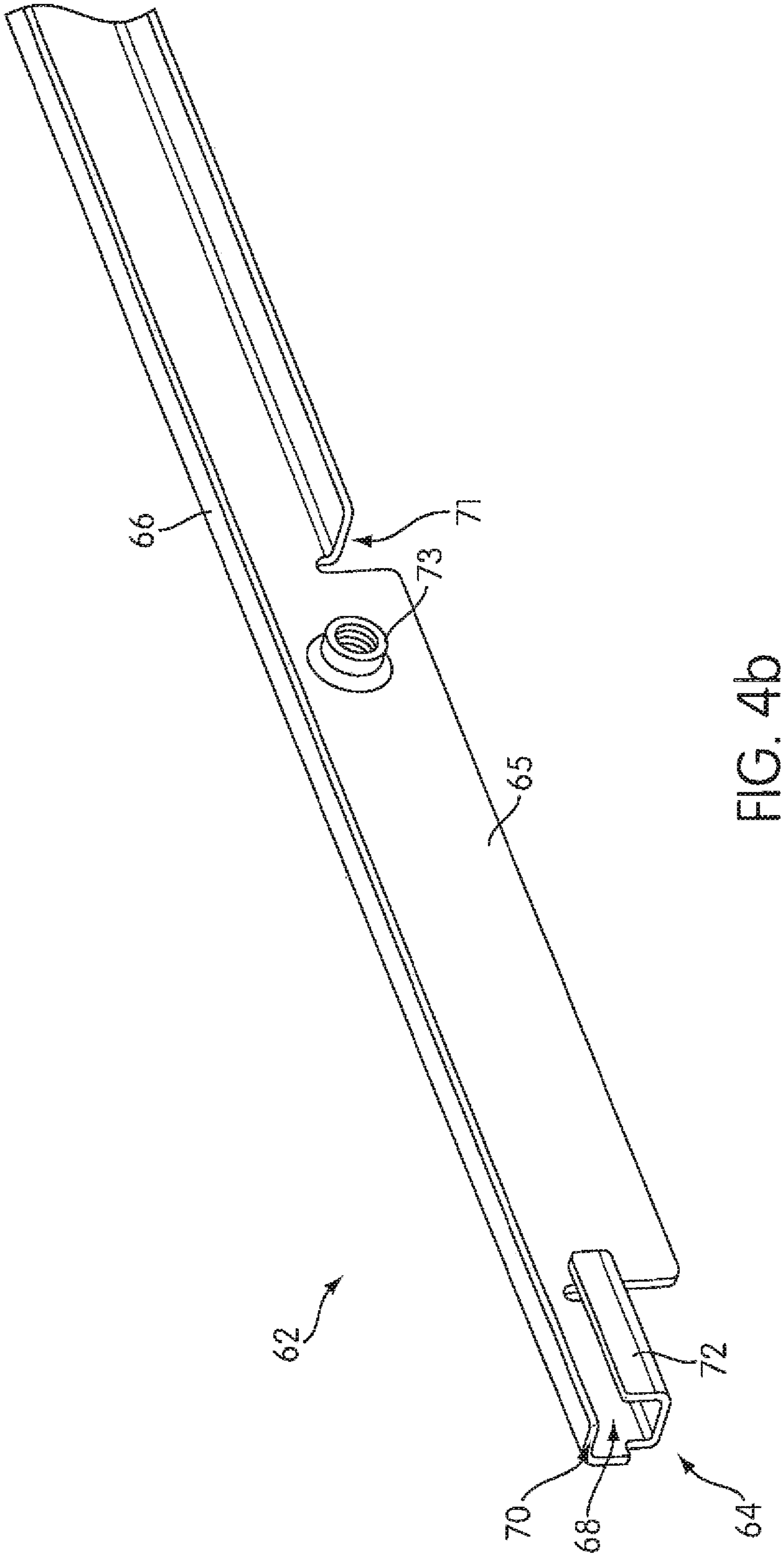
FIG. 4*b* illustrates a rod for use with the hanging file folder of FIG. 2 in accordance with an embodiment of the present disclosure.

FIG. 4*b* illustrates the rod portion 62 in accordance with an embodiment of the present disclosure. FIG. 4*b* illustrates a proximal end 64 of the rod 62 and elongated body 66. In an embodiment, the elongated body 66 of rod 62 may comprise a channel or a slot 68 for receiving hook portions 32 therein. As shown, the channel or slot 68 may comprise a "U"-shape at the proximal end 64 of the rod 66, but should not be limited to such.

The body 66 of rod 62 may be roll formed, for example. In an embodiment, the proximal end 64 of the body 66 comprises a channel 68 and a receiving portion 65. As shown, receiving portion 65 may be a section that is substantially flat. Rod 62 is designed to receive movably mounted hook portion 32 within its slot 68 and receiving portion 65, for example. Rod 62 comprises an end 70 for abutment with the abutment portion 54 of the hook portion 32. Rod 62 also comprises an end 71 for abutment with the distal end 38 of the hook portion 32.

The rod 62 may also comprise attachment features such as a rounded edge 72 and a male portion or extended mounting portion or pin 73. Limiting edge 72 and mounting portion 73 may be provided near the proximal end 64 of the rod 62, for example. Limiting edge 72 is designed to cooperate with the extension portion 50, bearing surface 51, and limiting portion 52 of the hook portion 32. The limiting edge 72 also provides an area for the bearing surface 51 to slide thereon along the rod 62, as shown in FIG. 4*c*.

The extended mounting portion or pin 73 may be formed with receiving portion 65 or in elongated body 66, for example. The extended mounting portion or pin 73 within the body 66 may be designed to cooperate with the female mounting portion or opening 57 of the hook portion 32. For example, when hook portion(s) 32 are connected to the first and second ends of a rod(s) 62, the opening 57 of the hook portion(s) 32 mate with the male, extended mounting portions 73 of the rod 62 to secure the hook portions 32 to the rod 62. In an embodiment, the extended mounting portion or pin 73 may comprise any number of shapes or designs designed to correspond with the shape of the mounting portion 57 of the hook 32.

Figure 4C:
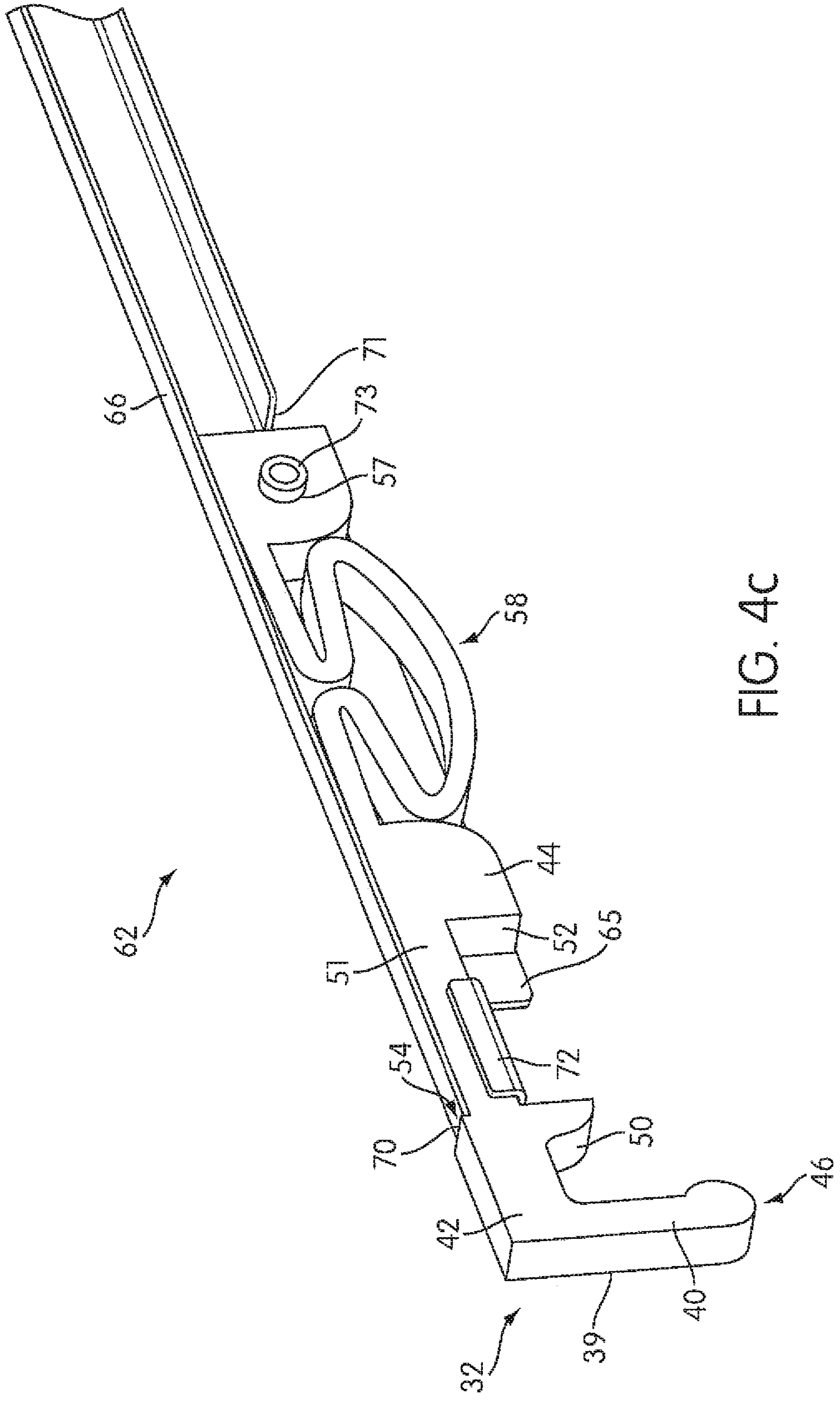
FIG. 4*c* illustrates an assembly of the hook portion and rod of FIGS. 4*a*-4*b* for use with the hanging file folder of FIG. 2 in accordance with an embodiment of the present disclosure.

FIG. 4*c* illustrates the final hook and rod assembly 30 of the hook portion 32 and rod 62 of FIGS. 4*a*-4*b* for use with the hanging file folder 10 of FIG. 2. (The manufacturing assembly process is further described with respect to FIGS. 8*a*-8*d* below). As shown, the hook portion 32 is mounted within the roll formed body 66 of the rod 62. The attachment features of the hook 32 (e.g., abutment portion 54 and mounting portion 57) and of the rod 62 (e.g., end 70, limiting edge 72, receiving portion 65, edge 71, and the mounting portion 73) mate together to hold the hook portion 32 within the rod 62. The attachment and insertion of the hook portion 32 into the rod 62 allows for adjustment of the effective length of the rod by permitting the hook portion 32 to move longitudinally with respect to the rod 62. The resilient structure 58 allows for the hook portion 32 to spring back into the rod body 66 when removed from a rail of a file drawer, for example.

When the hook portion 32 is moved longitudinally within the rod 62, the limiting portion 52 and limiting edge 72 limit the amount or length of extension of the hook portion 32.

Figure 5A:
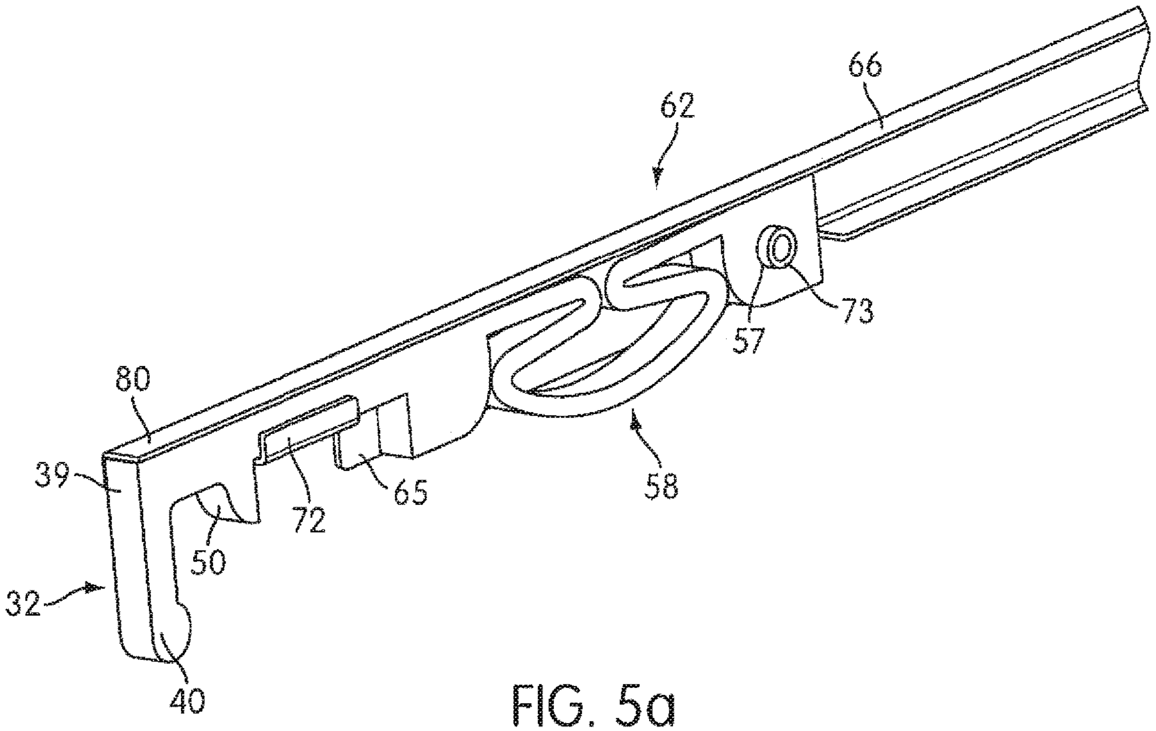
FIGS. 5*a* and 5*b* illustrate a front and back view of an extension that may be added to the assembly of FIG. 4*c* in accordance with an embodiment of the present disclosure.
Figure 5B:
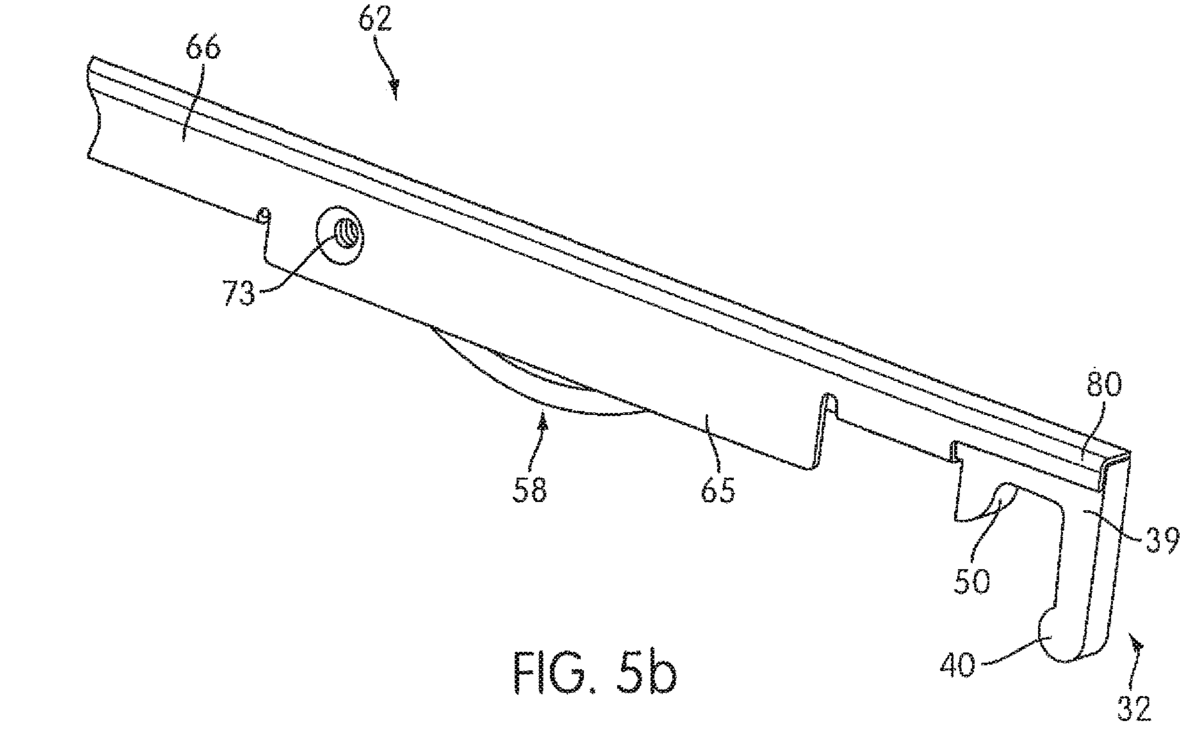
Figure 6A:
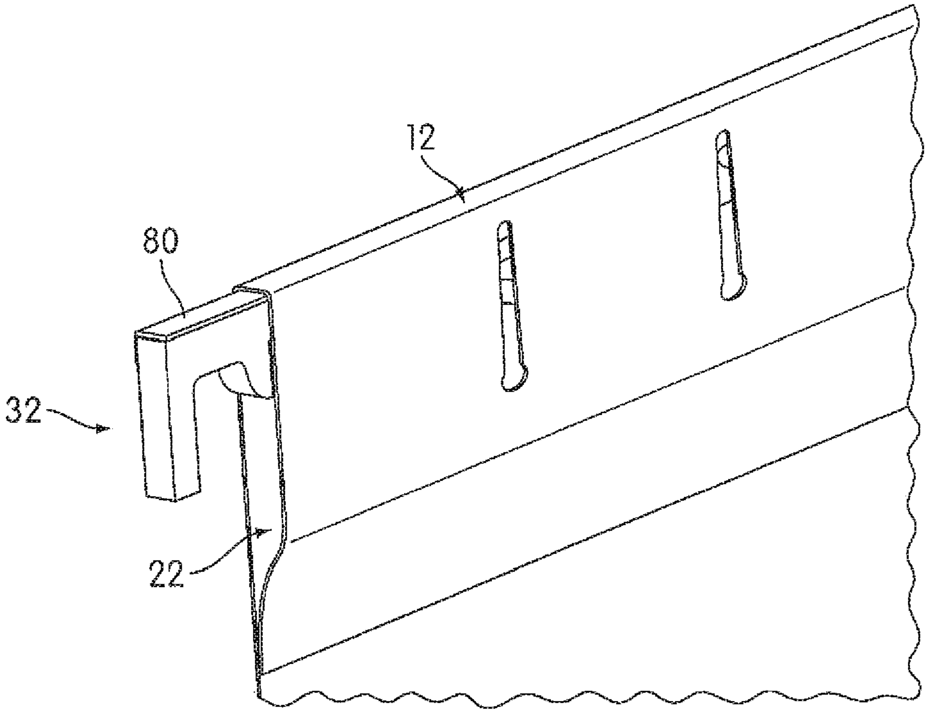
FIGS. 6*a* and 6*b* illustrate a front and back view of the extension of FIGS. 5*a* and 5*b* in use with a hanging file folder such as the hanging file folder of FIG. 2 in accordance with an embodiment of the present disclosure.
Figure 6B:
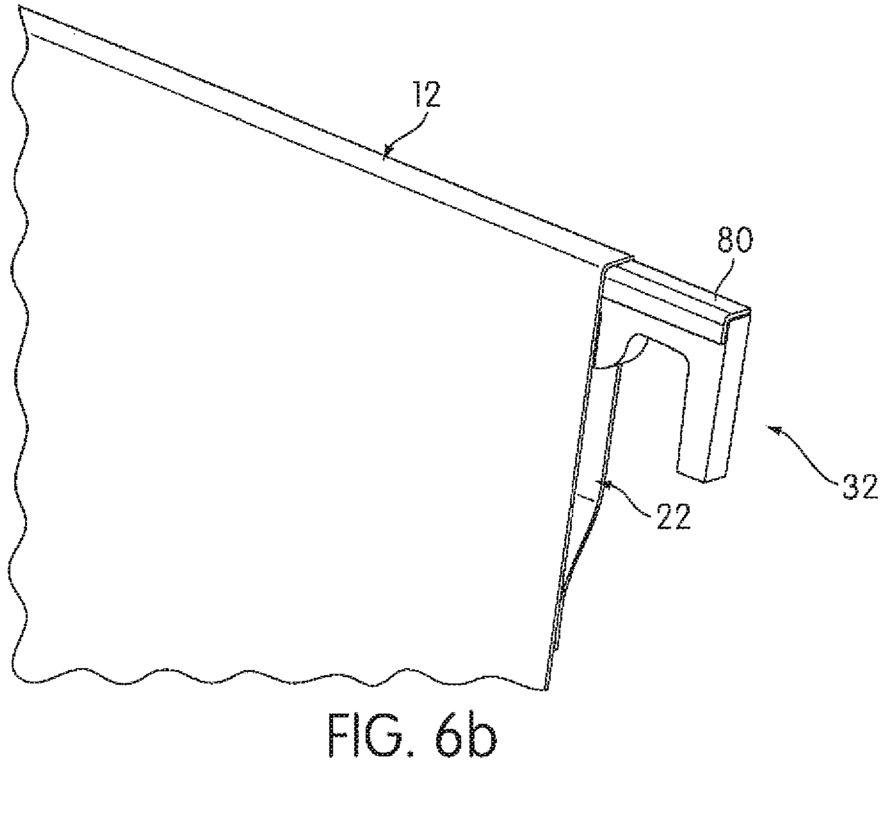

FIGS. 5*a* and 5*b* illustrate an extension 80 that may be added to the assembly of FIG. 4*c* in accordance with an embodiment of the present disclosure. For example, extension 80 may comprise a separate piece (not shown) to be added to the elongated body 66 of the rod portion 62, or may be formed with elongated body 66 uniformly (as shown in FIGS. 5*a* and 5*b*). The extension 80 may be designed to cover part of the hook portion 32 to enhance the appearance of the length of the rod 62, for example. For example, as shown, the extension 80 may be formed to sit over longitudinal portion 42 of the hook portion 32. The extension 80 may also enhance the strength of the hook portions 32. FIGS. 6*a* and 6*b* illustrate a front and back view of the extension 80 in use with a hanging file folder 10 in accordance with an embodiment of the present disclosure. As shown, the extension 80 may be visible outside of the body 11 of the file folder.

Figure 7A:
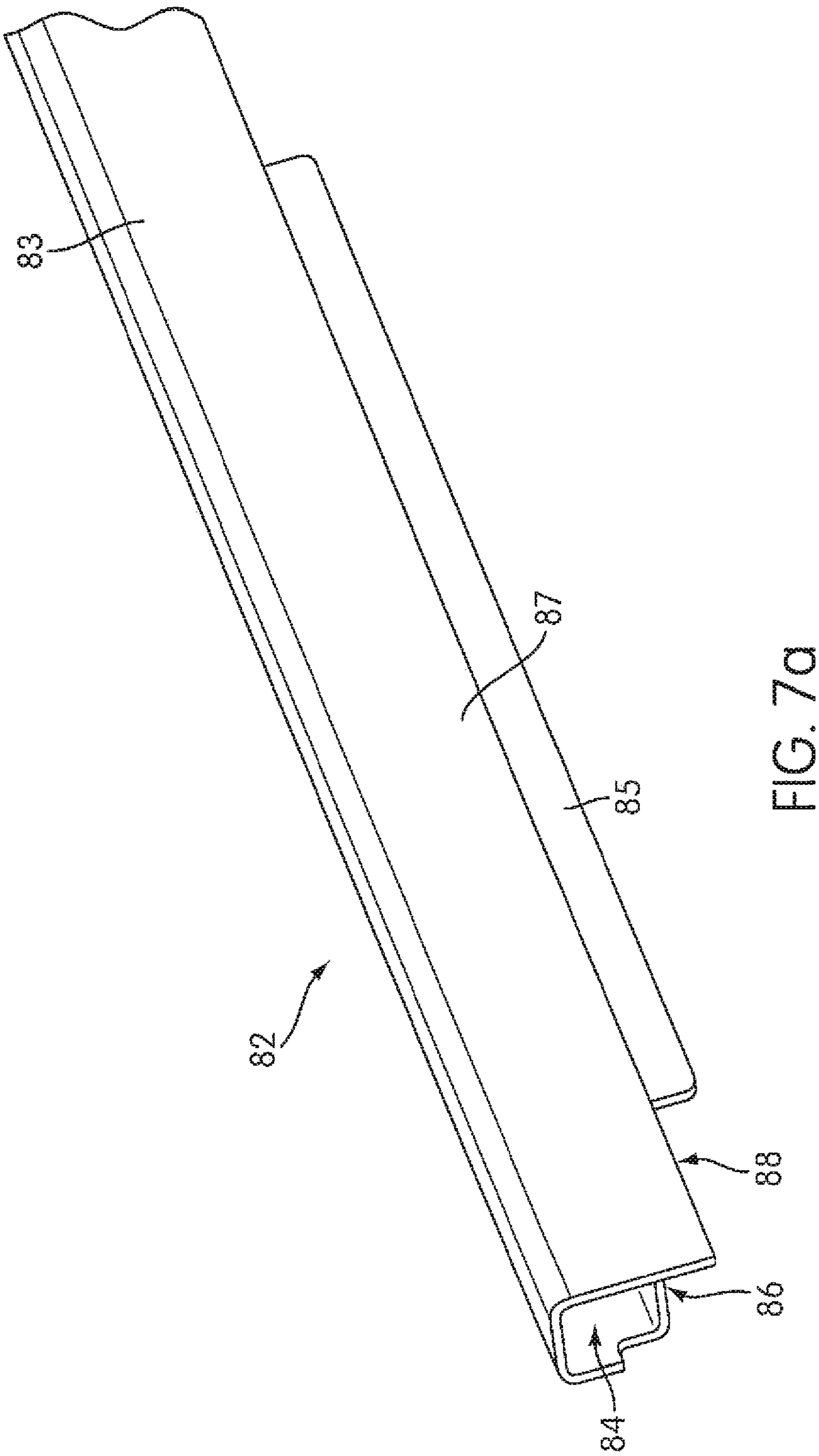
FIGS. 7*a* and 7*b* illustrate an alternate rod for use with the hook portion of FIG. 4*a* in accordance with an embodiment of the present disclosure.
Figure 7B:
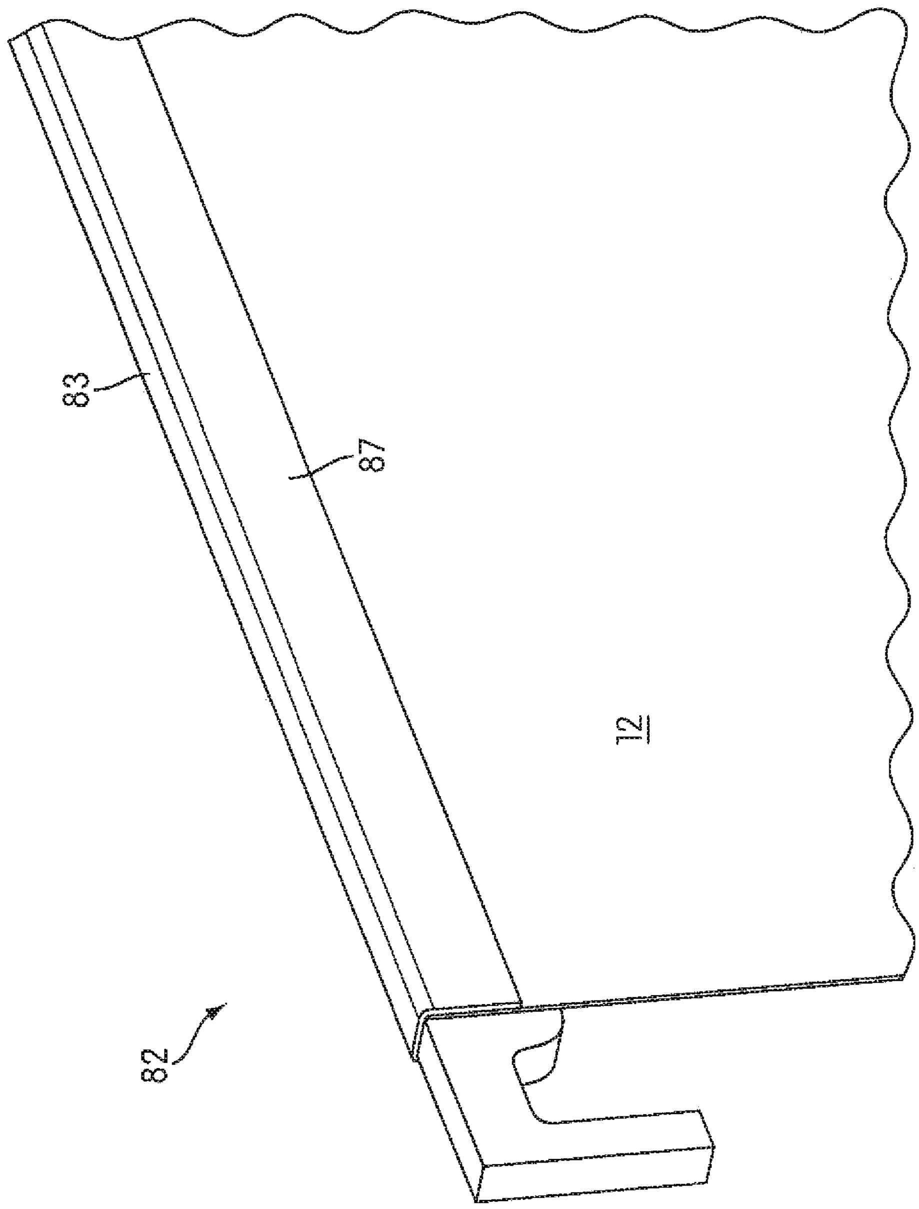

FIGS. 7*a* and 7*b* illustrate an alternate rod 82 for use with the hook portion(s) 32 of FIG. 3 in accordance with an embodiment of the present disclosure. Rod 82 is designed such that a channel 84 formed within the elongated body 83 that may capture a first or second wall 12, 14 of the body 11 of the file folder 10. For example, the first wall 12 may be inserted into a slot 88 formed by the receiving portion 85 and extension wall 87 formed in elongated body 83. A limiting portion 72, such as shown in FIG. 4*a*, may be formed with an edge 86 thereon for assisting in holding a wall 12, 14 of the folder 10. The wall 12 may be crimped in the slot 88 between the receiving portion 85, edge 86, and wall 87 of the elongate body 83 of the rod 82 as shown in FIG. 7*b*.

In an embodiment, the rod 62 may be formed from 0.4 millimeter (mm) steel material. In an embodiment, the rod may be formed from metal. For example, the rod may be formed from steel, brass, aluminum, or titanium. In an embodiment, the rod may be formed using a roll forming, stamping, extruding and/or punching, or other known manufacturing processes. In an embodiment, hook portion 32 may be formed from a resilient material. In an embodiment, the rod and/or hook portion may be formed from plastic. In an embodiment, the parts of the assembly 30 may be formed via extrusion process.

The assembly process may be performed on a conveyor system, for example. The rod portion 62 and its features (e.g., channel 68, limiting portion 72) may be formed through processes such as roll forming, stamping, extruding and/or punching. The hook portions 32 may be formed by stamping, punching, injection molding, or extrusion processes, for example. FIGS. 8*a*-8*d* illustrate a method of manufacturing and assembly for a hook portion 32 and a rod 62 of a hook and rod assembly such as shown in FIGS. 3-7*b* in accordance with an embodiment of the present disclosure.

In an embodiment, the assembly process is designed based on speed. For example, due to high volumes, assembly of the features may meet or exceed rates of 200 parts per minute. In order to meet such a criteria, the hook portions 32 are sorted and positioned individually in a hopper or fixture 92. The fixture 92 is designed to hold a plurality of hook portions 32 until the rod is in place for assembly.

Figure 8A:
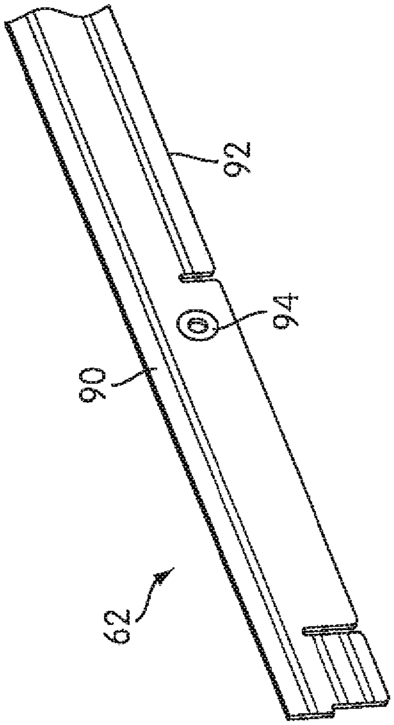
FIG. 8*a*-8*d* illustrate a method of assembly for a hook and rod assembly such as shown in FIGS. 3 and 4*a*-4*c* in accordance with an embodiment of the present disclosure.
Figure 8B:
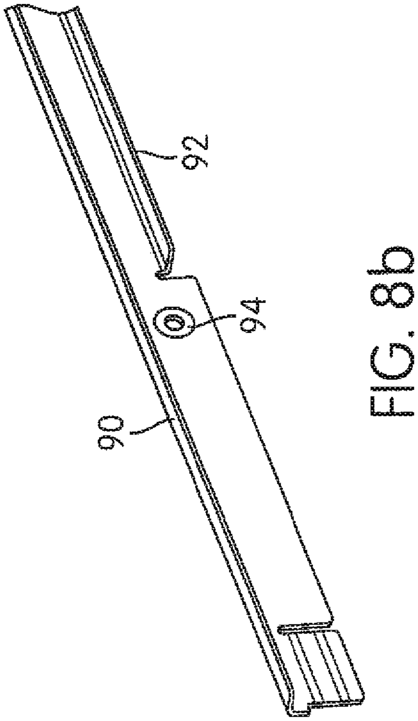
Figure 8C:
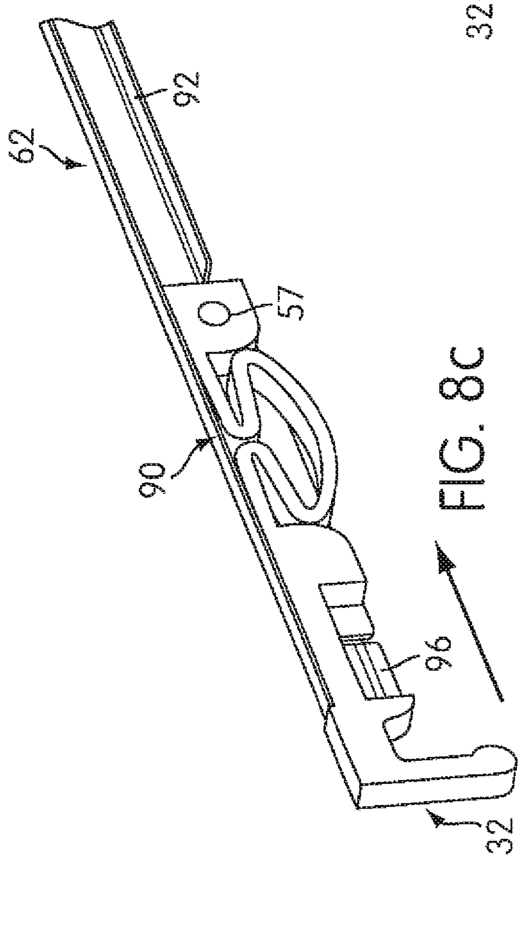

The manufacturing and assembly of the hook and rod assembly 30 may comprise the following steps: the rod is formed in the form of a substantially flat piece of material, as shown in FIG. 8*a*, through a stamping process, for example. The body of the rod 66, including the mounting portion shown as element 94, is substantially flat. At least a top edge 90 and bottom edge 92 are then roll formed to form the structure as shown in FIG. 8*b*. After roll forming (or otherwise forming) the rod 62, the rod 62 may be aligned with a fixture comprising a plurality of hook portions 32. The hook portions 32 may be aligned and positioned within the body 66 of the rod 62 as shown in FIG. 8*c*. For example, actuators (not shown) may be used to push a single hook portion 32 out of the fixture 92 and into the body 66 of the rod 62, as indicated by an arrow.

Figure 8D:
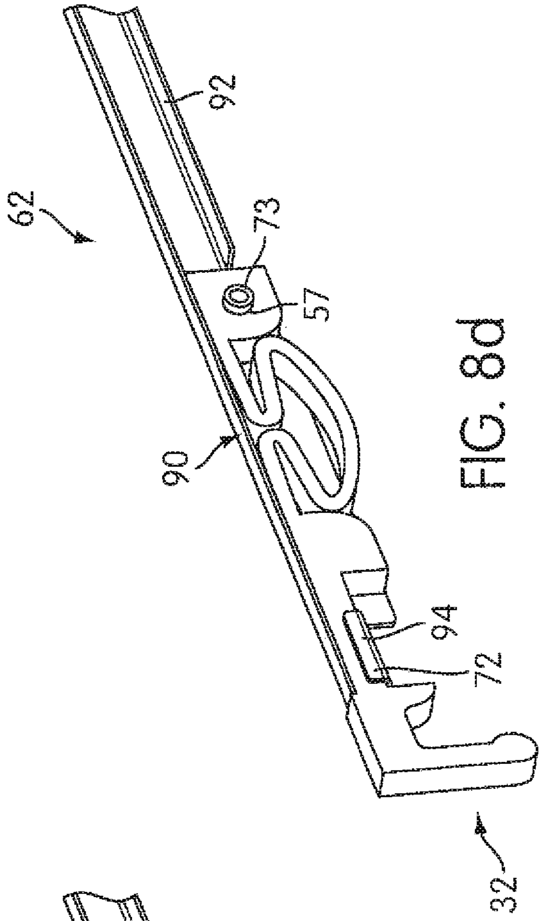

The rod 62 may then be deflected, stamped, or otherwise formed around the hook portion 32 so as to form attachment features for maintaining the hook portion 32 and rod 62 in a mating relationship. For example, in an embodiment, to facilitate assembly, the attachment features (i.e., limiting edge 72, mounting portion 73) of rod portion 62 may be formed from flat portions 96, 94, respectively, during the assembly as shown by FIGS. 8*c*-8*d*. After insertion and positioning of the hook portion 32 into the elongated body 66, the attachment features may be stamped to hold the hook portion 32 therein and thus complete the hook and rod as shown in FIG. 8*d*. In an embodiment, the method of attaching the hook portion to the rod may be automated. In an embodiment, mounting portions (such as a male portion (e.g., pin 73) or female portion (e.g., mounting portion 57)) may be formed on the hook portion and/or rod during the manufacturing/assembly process. In an embodiment, adhesive may be used to assist in fixing the hook portion and rod components together as well.

The above described manufacturing and assembly method enables one to fasten or secure the hook portion 32 in the assembly 30 in one motion, thus aiding in the assembly time needed to run this process at a high rate. However, the above noted materials and processes are merely exemplary and should not be limiting, and the rod and hook portions may be assembled using any number of materials and/or processes.

Although the hook and rod assembly 30 is herein described with hook portion 32 removably mounted to rod portion 62, as noted above, in an embodiment, hook and rod assembly 30 may be formed as a single unit. For example, hook and rod assembly 30 may be formed from materials (e.g., such as steel and/or spring steel) that allow for a single or uniform body. In an embodiment, the hook portion 32 may be attached to the rod 62 using known processes for unifying the assembly 30. For example, the hook portion 32 may be formed of spring steel which is attached to a rod 62 of steel.

Also, in an embodiment, the hook and rod assembly 30 may be used alone for mounting to a pair of spaced apart rails. That is, hook and rod assembly 30 need not be used in pairs, as shown with a file folder 10. For example, when hanging a magazine, newspaper, or other object, only one rail may be needed. Thus, the hook and rod assembly 30 may comprise a single rod with a pair of hooks portions, as described above, for hanging on spaced apart rails.

The hook and rod assembly 30 as herein described improves the quality of a file folder. The assembly 30 provides greater strength for holding documents and file therein on rails in a filing cabinet. For example, the roll-forming of the rod portion 62 increases the amount of weight that may be held by the file folder 10. The rod portion 62 also resists bending and twisting and thus resists deforming and buckling of the rod 62 under a load. The extension portion 80 also increases the strength of the overall assembly.

Also, the assembly 30 provides better engagement with rails 8 by providing minimal contact with the rail 8. By ensuring that only couple of points of the hook come in contact with the rail (e.g., by using a curved portion 48 with a changing radius), the file folder 10 or hook and rod assembly 30 may easily move with respect to the rail, such as when twisted with respect to the rails.

Figure 1:
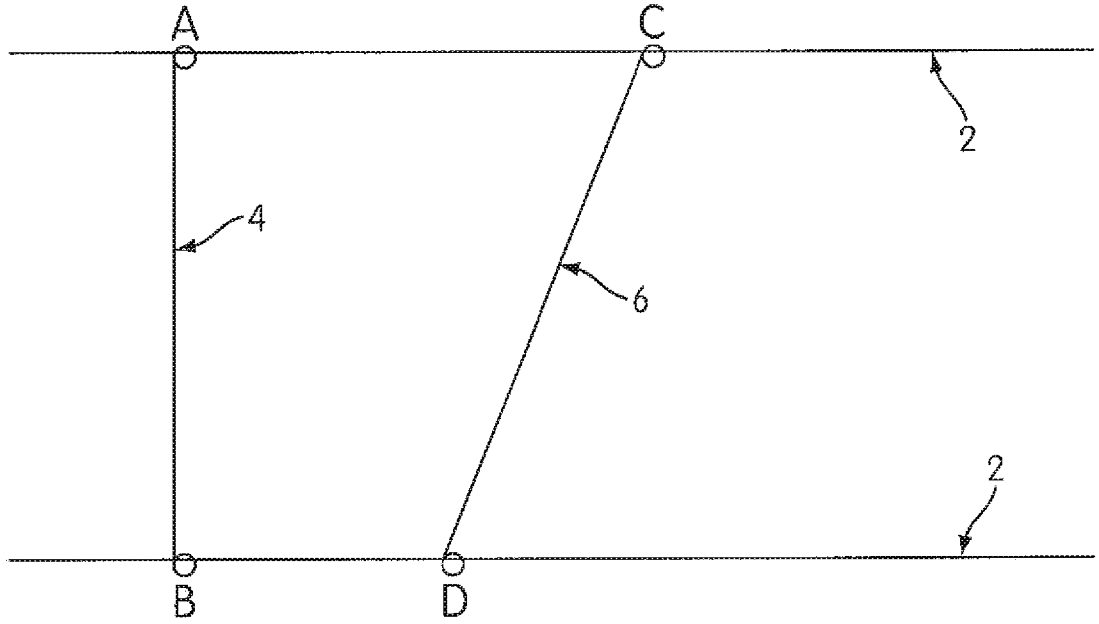
FIG. 1 illustrates an overhead view of file folders mounted or hanging on a pair of spaced apart rails.

The assembly is also designed to resist derailing or binding of the file folder. The file folder 10 or assembly 30 may be twisted to a maximum gripping angle while in contact with the rail. Additionally, the assembly 30 also increases the ease of sliding the hook and rod assembly 30 of the file folder along the length of a rail. When the file folders or the assembly 30 are moved or adjusted along the rails, such as shown by file folder 6 of FIG. 1, the assembly 30 may be pushed at an angle with respect to the rails, thereby creating a greater distance or span between the hooks of the rod during adjustment and sit between the rails. The design of the hook and rod assembly 30 increases the derailing angle at which at least one of the hooks on a rod dislodges from the rail. More specifically, the derailing angle of the hook and rod assembly 30 may be increased to at least 29 degrees.

The assembly 30 also allows for one to hang a file folder 10, magazine, or other object along spaced apart rails within cabinets which may not be provided at the same distance, such as along rails within a filing cabinet that may not be parallel or that may not be spaced the same distance from one another in one drawer or cabinet.

While the principles of the disclosure have been made clear in the illustrative embodiments set forth above, it will be apparent to those skilled in the art that various modifications may be made to the structure, arrangement, proportion, elements, materials, and components used in the practice of the teachings of the disclosure.

It will thus be seen that the objects of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. An adjustable rod for use in a filing system, the rod comprising:

an elongated body; and a hook portion mounted to the elongated body, the hook portion including:

a first planar surface;

a second planar surface;

a thickness between the first planar surface and the second planar surface;

a resilient portion formed between the first planar surface and the second planar surface, the resilient portion to enable the hook portion to move between an extended position and a retracted position relative to the elongated body;

a first extension formed between the first planar surface and the second planar surface;

a second extension formed between the first planar surface and the second planar surface, the hook portion slidably engageable with a rail of a filing system between the first extension and the second extension; and a third extension between the first planar surface and the second planar surface, the second extension between the first extension and the third extension, wherein a portion of the elongated body extends between the second extension and the third extension.

2. The adjustable rod of claim 1, wherein the hook portion further includes a radiused surface between the first extension and the second extension.

3. The adjustable rod of claim 1, wherein the thickness is about 2 millimeters.

4. The adjustable rod of claim 1, wherein the first extension is longer than the third extension.

5. The adjustable rod of claim 1, wherein the first extension, the second extension, and the third extension extend from a first side of the hook portion, the hook portion including an abutment surface on a second side of the hook portion.

6. The adjustable rod of claim 1, wherein the first extension has a length of about 9.6 millimeters to about 11.5 millimeters.

7. The adjustable rod of claim 1, wherein the elongated body forms a channel, the first planar surface and the second planar surface to slide within the channel.

8. The adjustable rod of claim 1, wherein the first extension is longer than the second extension.

9. The adjustable rod of claim 1, wherein the resilient portion has a rectangular cross section.

10. The adjustable rod of claim 1, wherein the first extension and the second extension are positioned outside of the elongated body in both the extended position and the retracted position.

11. The adjustable rod of claim 1, wherein the hook portion is a first hook portion mounted to or near a first end of the elongated body, and wherein the resilient portion is a first resilient portion, the adjustable rod including:

a second hook portion mounted to or near a second end of elongated body, the second hook portion including:

a third planar surface;

a fourth planar surface;

the thickness between the third planar surface and the fourth planar surface;

a second resilient portion formed between the third planar surface and the fourth planar surface, the second resilient portion to enable the second hook portion to extend from and retract into the second end of the elongated body;

a fourth extension formed between the third planar surface and the fourth planar surface; and a fifth extension formed between the third planar surface and the fourth planar surface, the second hook portion slidably engageable with a second rail of the filing system between the fourth extension and the fifth extension.

12. The adjustable rod of claim 11, wherein the first resilient portion and the second resilient portion are independently adjustable.

13. The adjustable rod of claim 11, wherein the elongated body forms a channel, the first planar surface, the second planar surface, the third planar surface, and the fourth planar surface to slide within the channel.

14. The adjustable rod of claim 11, wherein the elongated body includes:

a first edge stamped around the first hook portion adjacent to the second extension; and a second edge stamped around the second hook portion adjacent to the fourth extension.

15. The adjustable rod of claim 11, wherein the first extension and the second extension, are positioned outside of the elongated body when the first hook portion is extended or retracted, and the fourth extension, and the fifth extension are positioned outside of the elongated body when the second hook is extended or retracted.

16. The adjustable rod of claim 11, wherein the first hook portion includes a first abutment surface to limit retraction of the first hook portion relative to the first end of the elongated body and the second hook portion includes a second abutment surface to limit retraction of the second hook portion relative to the second end of the elongated body.

17. An adjustable rod for use in a filing system, the rod comprising:

an elongated body; and a hook portion mounted to the elongated body, the hook portion including:

a first planar surface;

a second planar surface;

a thickness between the first planar surface and the second planar surface;

a resilient portion formed between the first planar surface and the second planar surface, the resilient portion to enable the hook portion to move between an extended position and a retracted position relative to the elongated body;

a first extension formed between the first planar surface and the second planar surface;

a second extension formed between the first planar surface and the second planar surface, the hook portion slidably engageable with a rail of a filing system between the first extension and the second extension; and a third extension between the first planar surface and the second planar surface, the second extension between the first extension and the third extension, wherein the first extension, the second extension, and the third extension extend from a first side of the hook portion, the hook portion including an abutment surface on a second side of the hook portion, and wherein the third extension and at least one of the second extension or the abutment surface limit extension or retraction of the hook portion.

18. An adjustable rod for use in a filing system, the rod comprising:

an elongated body; and a hook portion mounted to the elongated body, the hook portion including:

a first planar surface;

a second planar surface;

a thickness between the first planar surface and the second planar surface;

a resilient portion formed between the first planar surface and the second planar surface, the resilient portion having a rectangular cross section, the resilient portion having at least two bends, and the resilient portion to enable the hook portion to move between an extended position and a retracted position relative to the elongated body;

a first extension formed between the first planar surface and the second planar surface; and a second extension formed between the first planar surface and the second planar surface, the hook portion slidably engageable with a rail of a filing system between the first extension and the second extension.

* * * * *